(12) United States Patent
Suzuki et al.

(10) Patent No.: US 10,382,752 B2
(45) Date of Patent: Aug. 13, 2019

(54) IMAGE PROCESSING DEVICE AND METHOD

(71) Applicant: SONY CORPORATION, Tokyo (JP)

(72) Inventors: Teruhiko Suzuki, Kanagawa (JP); Nicholas Ian Saunders, Basingstoke (GB); Karl James Sharman, Eastleigh (GB); James Alexander Gamei, Kingston-upon-Thames (GB)

(73) Assignee: SONY CORPORATION, Tokyo (JP)

(*) Notice: Subject to any disclaimer, the term of this patent is extended or adjusted under 35 U.S.C. 154(b) by 245 days.

(21) Appl. No.: 15/026,728

(22) PCT Filed: Oct. 1, 2014

(86) PCT No.: PCT/JP2014/076253
§ 371 (c)(1),
(2) Date: Apr. 1, 2016

(87) PCT Pub. No.: WO2015/056566
PCT Pub. Date: Apr. 23, 2015

(65) Prior Publication Data
US 2016/0219275 A1     Jul. 28, 2016

(30) Foreign Application Priority Data
Oct. 15, 2013 (JP) ................................ 2013-215136

(51) Int. Cl.
*H04N 19/136* (2014.01)
*H04N 19/11* (2014.01)
*H04N 19/70* (2014.01)
*H04N 19/186* (2014.01)

(52) U.S. Cl.
CPC .......... *H04N 19/11* (2014.11); *H04N 19/186* (2014.11); *H04N 19/70* (2014.11)

(58) Field of Classification Search
CPC ....... H04N 19/11; H04N 19/186; H04N 19/70
See application file for complete search history.

(56) References Cited

U.S. PATENT DOCUMENTS

| | | | | |
|---|---|---|---|---|
| 7,944,968 B2* | 5/2011 | Winger | ................ | H04N 19/176 375/240.03 |
| 8,050,326 B2* | 11/2011 | Yoon | .................... | H04N 19/159 375/240.12 |

(Continued)

OTHER PUBLICATIONS

David Flynn, "High Efficiency Video Coding (HEVC) Range Extensions text specifications: Draft 4" JCTVC-N1005_v1, Apr. 18-26, 2013.*

(Continued)

*Primary Examiner* — Sathyanaraya V Perungavoor
*Assistant Examiner* — Philip P. Dang
(74) *Attorney, Agent, or Firm* — Chip Law Group

(57) ABSTRACT

The present disclosure relates to an image processing device and a method that enable easier encoding and decoding of a wider variety of images. The image processing device includes a setting unit that sets a parameter indicating a setting state of a coding tool required in specifying an extended profile that is an extension of a profile specified in a coding standard for performing encoding on each unit having a recursive hierarchical structure. The image processing device further includes an encoding unit that generates an encoded stream by encoding an image in accordance with the parameter set by the setting unit. The present disclosure can be applied to image processing devices that encode image data, for example.

16 Claims, 33 Drawing Sheets

(56) References Cited

U.S. PATENT DOCUMENTS

| | | | | |
|---|---|---|---|---|
| 8,170,097 B2* | 5/2012 | Tabatabai | ............... | H04N 19/70 375/240.01 |
| 8,369,422 B2* | 2/2013 | Yin | ............... | H04N 19/159 345/600 |
| 2008/0304566 A1* | 12/2008 | Yoon | ............... | H04N 19/105 375/240.12 |
| 2010/0128786 A1* | 5/2010 | Gao | ............... | H04N 19/147 375/240.13 |
| 2011/0228855 A1* | 9/2011 | Gao | ............... | H04N 19/70 375/240.18 |
| 2012/0106636 A1* | 5/2012 | Kim | ............... | H04N 19/176 375/240.12 |
| 2012/0121018 A1* | 5/2012 | Kustka | ............... | H04N 19/174 375/240.16 |
| 2012/0281754 A1* | 11/2012 | Sato | ............... | H04N 19/176 375/240.03 |
| 2013/0107973 A1* | 5/2013 | Wang | ............... | H04N 19/70 375/240.29 |
| 2013/0163668 A1* | 6/2013 | Chen | ............... | H04N 19/197 375/240.14 |
| 2013/0188013 A1* | 7/2013 | Chen | ............... | H04N 19/597 348/43 |

OTHER PUBLICATIONS

Gary Sullivan, Meeting report of the 14th meeting of the Joint Collaborative Team on Video Coding (JCT-VC), Vienna, AT, Jul. 25-Aug. 2, 2013.*

David Flynn, "High Efficiency Video Coding (HEVC) Range Extensions text specifications: Draft 4" JCTVC-N1005_v1, Apr. 18-26, 2013. (Year: 2013).*

Gary Sullivan, Meeting report of the 14th meeting of the Joint Collaborative Team on Video Coding (JCT-VC), Vienna, AT, Jul. 25-Aug. 2, 2013 (Year: 2013).*

Benjamin Bross, Editor's Proposed Corrections to HEVC Version 1, Apr. 18-26, 2013, JCTVC-M0432_V3 (Year: 2013).*

David Flynn, Joel Sole, Teruhiko Suzuki, "High Efficiency Video Coding (HEVC) Range Extensions text specification: Draft 4", Joint Collaboration Team on Video Coding (JCT-VC) of ITU-T SG 16 WP 3 and ISO/IEC JTC 1/SC 29/WG11, 13th Meeting: Incheon, KR, Apr. 18-26, 2013. (Document JCTVC-N1005_v1).

Benjamin Bross, Gary J. Sullivan, Ye-Kui Wang, "Editor's proposed corrections to HEVC version 1", Joint Collaboration Team on Video Coding (JCT-VC) of ITU-T SG 16 WP 3 and ISO/IEC JTC 1/SC 29/WG11, 13th Meeting: Incheon, KR, Apr. 18-26, 2013. (Document JCTVC-M0432_v3).

T. Suzuki, K. Sharman, N. Saunders, "Proposal on the profile definition of Range extensions", Joint Collaboration Team on Video Coding (JCT-VC) of ITU-T SG 16 WP 3 and ISO/IEC JTC 1/SC 29/WG11, 13th Meeting: Incheon, KR, Apr. 18-26, 2013. (Document JCTVC-M0094).

Gary Sullivan, Jens-Rainer Ohm, Meeting report on the 14th meeting of the Joint Collaborative Team on Video Coding (JCT-VC), Vienna, AT, Jul. 25-Aug. 2, 2013 (Joing Collaborative Team on Video Coding (JCT-VC) of ITU-T SG16 WP3 and ISO/IEC JTC1/SC29/WG11 14th Meeting: Vienna, AT, Jul. 25-Aug. 2, 2013).

* cited by examiner

FIG. 2

|  | Profile | Profile IDC | Chroma Formats | | | | Maximum bitDepth | Prediction | | extended precision | Profiles Also Supported |
|---|---|---|---|---|---|---|---|---|---|---|---|
|  |  |  | 4:0:0 | 4:2:0 | 4:2:2 | 4:4:4 |  | Intra | Inter |  |  |
| Main 4:2:0 | Main | 1* | ✗ | ✓ | ✗ | ✗ | 8 | ✓ | ✓ | 0 | |
|  | Main 10 | 2* | ✗ | ✓ | ✗ | ✗ | 10 | ✓ | ✓ | 0 | Main |
|  | Main Still | 3* | ✗ | ✓ | ✗ | ✗ | 8 | ✓ | ✗ | 0 | |
|  | Main 12 4:2:0 | 4¹ | ✓ | ✓ | ✗ | ✗ | 12 | ✓ | ✓ | 0 | Main 10, Main |
|  | Main Intra 12 4:2:0 | 4¹ | ✓ | ✓ | ✗ | ✗ | 12 | ✓ | ✗ | 0 | Main 10, Main |
| Main 4:2:2 | Main 10 4:2:2 | 4¹ | ✓ | ✓ | ✓ | ✗ | 10 | ✓ | ✓ | 0 | Main 10, Main |
|  | Main 12 4:2:2 | 4¹ | ✓ | ✓ | ✓ | ✗ | 12 | ✓ | ✓ | 0 | Main 10 4:2:2, Main 12 4:2:0, Main Intra 12 4:2:2, Main Intra 12 4:2:0 |
|  | Main Intra 12 4:2:2 | 4¹ | ✓ | ✓ | ✓ | ✗ | 12 | ✓ | ✗ | 0 | Main Intra 12 4:2:0 |
| Main 4:4:4 | Main 10 4:4:4 | 4¹ | ✓ | ✓ | ✓ | ✓ | 10 | ✓ | ✓ | 0 | Main 10 4:2:2 |
|  | Main 12 4:4:4 | 4¹ | ✓ | ✓ | ✓ | ✓ | 12 | ✓ | ✓ | 0 | Main 12 4:2:2, Main 10 4:4:4, Main Intra 12 4:4:4 |
|  | Main Intra 12 4:4:4 | 4¹ | ✓ | ✓ | ✓ | ✓ | 12 | ✓ | ✗ | 0 | Main Intra 12 4:2:2 |
| High | High 16 Intra 4:0:0 | 5 | ✓ | ✗ | ✗ | ✗ | 16 | ✓ | ✗ | 1 or 0 | Main 12 Intra 4:4:4, High 16 Intra 4:2:0 |
|  | High 16 Intra 4:2:0 | 5 | ✓ | ✓ | ✗ | ✗ | 16 | ✓ | ✗ | 1 or 0 | High 16 Intra 4:0:0 |
|  | High 16 4:0:0 | 5 | ✓ | ✗ | ✗ | ✗ | 16 | ✓ | ✓ | 1 or 0 | High 16 Intra 4:0:0 |
|  | High 16 4:4:4 | 5 | ✓ | ✓ | ✓ | ✓ | 16 | ✓ | ✓ | 1 or 0 | Main 12 4:4:4, High 16 Intra 4:4:4 |

FIG. 3

The points of the above new profiles are.

- High 16 profiles support greater bit depths(up to 16 bit), and would give the opportunity for new tools to be defined(which may improve coding efficiency or throughput or reduce complexity). Higher internal precisions would be included in these profiles. In High 16 profiles, extended_precision_processing_flag could be either 0 or 1, while extended_precision_processing_flag is limited to 0 in Main profile.

- Intra only profiles are defined by limiting all pictures with the following restrictions.
  - nal_unit_type is equal to IDR_W_LP, CRA_NUT or BLA_N_LP
  - No reordering is allowed
  - No short term ref pic sets and no long term pic are allowed
  - Allowed to send in-loop filter parameters, but in-loop filter is not mandatory

- To simplify the implementation, no new tools are included for intra only profiles.
- 4:0:0 profiles are defined for High 16 profiles to support monochrome video.

FIG. 4

| Profile | CpbBrVclFactor | CpbBrNalFactor | FormatCapabilityFactor | MinCrScaleFactor |
|---|---|---|---|---|
| Main | 1000 | 1100 | 1.500 | 1.0 |
| Main 10 | 1000 | 1100 | 1.875 | 1.0 |
| Main 12 | 1000 | 1100 | 2.250 | 1.0 |
| Main 4:2:2 10 | 1250 | 1375 | 2.500 | 0.5 |
| Main 4:2:2 12 | 1250 | 1375 | 3.000 | 0.5 |
| Main 4:4:4 10 | 1500 | 1650 | 3.750 | 0.5 |
| Main 4:4:4 12 | 1500 | 1650 | 4.500 | 0.5 |
| High 4:0:0 16 | 2000 | 2200 | 4.500 | 0.5 |
| High 4:4:4 16 | 2000 | 2200 | 4.500 | 1.0 |
| Main 12 Intra | 4000 | 4400 | 2.250 | 1.0 |
| Main 4:2:2 12 Intra | 4000 | 4400 | 3.000 | 0.5 |
| Main 4:4:4 12 Intra | 4000 | 4400 | 3.750 | 0.5 |
| High 4:0:0 16 Intra | 4000 | 4400 | 4.5 | 0.5 |
| High 4:4:4 16 Intra | 4000 | 4400 | 4.5 | 0.5 |

A

In the case of AVC, all intra coding was supposed to be included in High 4:2:2 and High 4:4:4 profiles. The maximum bitrate of the High 4:2:2 profile was inadvertently larger than that of the High 4:4:4 profile. However, this bitrate is too high for inter-frame coding (and all intra profiles were created later).

| | Descriptor |
|---|---|
| profile_tier_level(maxNumSubLayersMinus1) { | |
|   general_profile_space | u(2) |
|   general_tier_flag | u(1) |
|   general_profile_idc | u(5) |
|   for(j=0; j<32; j++) | |
|     general_profile_compatibility_flag[j] | u(1) |
|   general_progressive_source_flag | u(1) |
|   general_interlaced_source_flag | u(1) |
|   general_non_packed_constraint_flag | u(1) |
|   general_frame_only_constraint_flag | u(1) |
|   general_intra_constraint_flag | u(1) |
|   general_max_10bit_constraint_flag | u(1) |
|   general_max_12bit_constraint_flag | u(1) |
|   general_max_1bit_constraint_flag | u(1) |
|   general_reserved_zero_2bits | u(2) |
|   general_max_400chroma_constraint_flag | u(1) |
|   general_max_420chroma_constraint_flag | u(1) |
|   general_max_422chroma_constraint_flag | u(1) |
|   general_reserved_zero_35bits | u(35) |
|   general_level_idc | u(8) |
|   for(i=0; i<maxNumSubLayersMinus1; i++) { | |
|     sub_layer_profile_present_flag[i] | u(1) |
|     sub_layer_level_present_flag[i] | u(1) |
|   } | |
|   if(maxNumSubLayersMinus1>0) | |
|     for(i=maxNumSubLayersMinus1; i<8; i++) | |
|       reserved_zero_2bits[i] | u(2) |
|   for(i=0; i<maxNumSubLayersMinus1; i++) { | |
|     if(sub_layer_profile_present_flag[i]) { | |
|       sub_layer_profile_space[i] | u(2) |
|       sub_layer_tier_flag[i] | u(1) |
|       sub_layer_profile_idc[i] | u(5) |
|       for(j=0; j<32; j++) | |
|         sub_layer_profile_compatibility_flag[i][j] | u(1) |
|       sub_layer_progressive_source_flag[i] | u(1) |
|       sub_layer_interlaced_source_flag[i] | u(1) |
|       sub_layer_non_packed_constraint_flag[i] | u(1) |
|       sub_layer_frame_only_constraint_flag[i] | u(1) |
|       sub_layer_intra_constraint_flag | u(1) |
|       sub_layer_max_10bit_constraint_flag | u(1) |
|       sub_layer_max_12bit_constraint_flag | u(1) |
|       sub_layer_max_1bit_constraint_flag | u(1) |
|       sub_layer_reserved_zero_2bits | u(2) |
|       sub_layer_max_400chroma_constraint_flag | u(1) |
|       sub_layer_max_420chroma_constraint_flag | u(1) |
|       sub_layer_max_422chroma_constraint_flag | u(1) |
|       sub_layer_reserved_zero_35bits[i] | u(35) |
|     } | |
|     if(sub_layer_level_present_flag[i]) | |
|       sub_layer_level_idc[i] | u(8) |
|   } | |
| } | |

FIG. 6 general_intra_constraint_flag equal to 1 specifies that all pictures have nal_unit_type equal to IDR_N_LP (or CRA_NUT or BLA_N_LP). When general_profile_idc is not equal to 4 and general_profile_compatibility_flag[ 4 ] is not equal to 1, general_intra_constraint_flag shall be equal to 0.

general_max_16bit_constraint_flag, general_max_12bit_constraint_flag, general_max_10bit_constraint_flag, general_max_422chroma_constraint_flag, general_max_420chroma_constraint_flag and general_max_400chroma_constraint_flag, when general_profile_idc is equal to 4 or general_profile_compatibility_flag[ 4 ] is equal to 1, have semantics specified in Annex A. When general_profile_idc is not equal to 4 and general_profile_compatibility_flag[ 4 ] is not equal to 1, general_max_16bit_constraint_flag, general_max_12bit_constraint_flag, general_max_10bit_constraint_flag, general_max_422chroma_constraint_flag, general_max_420chroma_constraint_flag and general_max_400chroma_constraint_flag shall be equal to 0 in bitstreams conforming to this version of this Specification. When general_profile_idc is not equal to 4 and general_profile_compatibility_flag[ 4 ] is not equal to 1, the value 1 for each syntax element general_max_16bit_constraint_flag, general_max_12bit_constraint_flag, general_max_10bit_constraint_flag, general_max_422chroma_constraint_flag, general_max_420chroma_constraint_flag and general_max_400chroma_constraint_flag is reserved for future use by ITU-T | ISO/IEC, and decoders shall ignore the values of these syntax elements.

general_reserved_zero_2bits shall be equal to 0 in bitstreams conforming to this version of this Specification. Other values for general_reserved_zero_2bits are reserved for future use by ITU-T | ISO/IEC. Decoders shall ignore the value of general_reserved_zero_2bits.

general_reserved_zero_35bits shall be equal to 0 in bitstreams conforming to this version of this Specification. Other values for general_reserved_zero_35bits are reserved for future use by ITU-T | ISO/IEC. Decoders shall ignore the value of general_reserved_zero_35bits.

FIG. 7 sub_layer_intra_constraint_flag equal to 1 specifies that all pictures have nal_unit_type equal to IDR_N_LP (or CRA_NUT or BLA_N_LP). When sub_layer_profile_idc[i] is not equal to 4 and sub_layer_profile_compatibility_flag[4] [i] is not equal to 1, sub_layer_intra_constraint_flag shall be equal to 0.

The semantics of the syntax elements sub_layer_profile_space[i], sub_layer_tier_flag[i], sub_layer_profile_idc[i], sub_layer_profile_compatibility_flag[i][j], sub_layer_progressive_source_flag[i], sub_layer_interlaced_source_flag[i], sub_layer_non_packed_constraint_flag[i], sub_layer_frame_only_constraint_flag[i], sub_layer_max_10bit_constraint_flag, sub_layer_max_12bit_constraint_flag, sub_layer_max_10bit_constraint_flag, sub_layer_max_422chroma_constraint_flag, sub_layer_max_420chroma_constraint_flag, sub_layer_max_40chroma_constraint_flag, sub_layer_reserved_zero_35bits[i], and sub_layer_level_idc[i] are the same as the syntax elements general_profile_space, general_tier_flag, general_profile_idc, general_profile_compatibility_flag[j] general_progressive_source_flag, general_interlaced_source_flag, general_non_packed_constraint_flag, general_frame_only_constraint_flag, general_max_16bit_constraint_flag, general_max_12bit_constraint_flag, general_max_10bit_constraint_flag, general_max_422chroma_constraint_flag, general_max_420chroma_constraint_flag and general_max_40chroma_constraint_flag, general_reserved_zero_35bits, and general_level_idc, respectively, but apply to the representation of the sub-layer with TemporalId equal to i.

When not present, the value of sub_layer_tier_flag[i] is inferred to be equal to 0.

NOTE 8 -- It is possible that sub_layer_tier_flag[i] is not present and sub_layer_level_idc[i] is present. In this case, a default value of sub_layer_tier_flag[i] is needed for interpretation of sub_layer_level_idc[i].

FIG. 8

Bitstreams conforming to the Main 12, Main 4:2:2 10, Main 4:2:2 12, Main 4:4:4 10, Main 4:4:4 12, High 4:0:0 16 and High 4:4:4 16 profiles shall obey the following constraints:

- In bitstreams conforming to the Main 12, Main 4:2:2 10 or Main 4:2:2 12 profile, SPSs shall have chroma_format_idc constrained as follows:
- In bitstreams conforming to the Main 12, Main 4:2:2 10 or Main 4:2:2 12 profile, SPSs shall have chroma_format_idc equal to 0 or 1 only.
- In bitstreams conforming to the Main 4:2:2 10 or Main 4:2:2 12 profile, SPSs shall have chroma_format_idc equal to 0, 1 or 2 only.
- SPSs shall have bit_depth_luma_minus8 and bit_depth_chroma_minus8 constrained as follows:
- In bitstreams conforming to the Main 4:2:2 10 or Main 4:4:4 10 profile, SPSs shall have bit_depth_luma_minus8 and bit_depth_chroma_minus8 in the range of 0 to 2, inclusive.
- In bitstreams conforming to the Main 12, Main 4:2:2 12, or Main 4:4:4 12 profile, SPSs shall have bit_depth_luma_minus8 and bit_depth_chroma_minus8 in the range of 0 to 4, inclusive.
- In bitstreams conforming to the Main 12, Main 4:2:2 10, Main 4:2:2 12, Main 4:4:4 10, Main 4:4:4 12, High 4:0:0 16 and High 4:4:4 16 profiles,
- SPSs shall have separate_colour_plane_flag, when present, equal to 0 only.
- SPSs shall have extended_precision_processing_flag, when present, equal to 0 only.
- CtbLog2SizeY shall be in the range of 4 to 6, inclusive.

FIG. 9

- When a PPS has tiles_enabled_flag is equal to 1, it shall have entropy_coding_sync_enabled_flag equal to 0.

- When a PPS has tiles_enabled_flag is equal to 1, ColumnWidthInLumaSamples[ i ] shall be greater than or equal to 256 for all values of i in the range of 0 to num_tile_columns_minus1, inclusive, and RowHeightInLumaSamples[ j ] shall be greater than or equal to 64 for all values of j in the range of 0 to num_tile_rows_minus1, inclusive.

- The number of times read_bits( 1 ) is called in subclauses 9.3.4.3.3 and 9.3.4.3.4 when parsing coding_tree_unit( ) data for any coding tree unit shall be less than or equal to 5 * RawCtuBits / 3.

- general_level_idc shall not be equal to 255 (which indicates level 8.5).

- transform_skip_rotation_enabled_flag, transform_skip_context_enabled_flag, intra_block_copy_enabled_flag, residual_dpcm_intra_enabled_flag and residual_dpcm_inter_enabled_flag shall be equal to <TO BE DECIDED AT THE NEXT MEETING>

- In bitstreams conforming to the Main 12, Main 4:2:2 10, Main 4:2:2 12, Main 4:4:4 10 and Main 4:4:4 12 profiles, extended_precision_processing_flag shall be equal to 0.

- In bitstreams conforming to the High 4:0:0 16 and High 4:4:4 16 profiles, extended_precision_processing_flag is equal to 0 or 1.

- The level constraints specified for the Main 12, Main 4:2:2 10, Main 4:2:2 12, Main 4:4:4 10, Main 4:4:4 12, High 4:0:0 16 or High 4:4:4 16 profile in in subclauses A.4, as applicable, shall be fulfilled.

FIG. 10

Conformance of a bitstream to the Main 12, Main 4:2:2 10, Main 4:2:2 12, Main 4:4:4 10, Main 4:4:4 12, High 4:0:0 16 or High 4:4:4 16 profile is indicated by general_profile_idc being equal to 4 or general_profile_compatibility_flag[ 4 ] being equal to 1 with the following additional indications as applicable:

– Conformance of the bitstream to the Main 12 profile is indicated by general_max_12bit_constraint_flag equal to 1, general_max_10bit_constraint_flag equal to 0, general_max_422chroma_constraint_flag equal to 1, general_max_420chroma_constraint_flag equal to 1 and general_max_400chroma_constraint_flag equal to 0.

– Conformance of the bitstream to the Main 4:2:2 10 profile is indicated by general_max_12bit_constraint_flag equal to 1, general_max_10bit_constraint_flag equal to 1, general_max_422chroma_constraint_flag equal to 1, general_max_420chroma_constraint_flag equal to 1 and general_max_400chroma_constraint_flag equal to 0.

– Conformance of the bitstream to the Main 4:2:2 12 profile is indicated by general_max_12bit_constraint_flag equal to 1, general_max_10bit_constraint_flag equal to 0, general_max_422chroma_constraint_flag equal to 1, general_max_420chroma_constraint_flag equal to 0 and general_max_400chroma_constraint_flag equal to 0.

FIG. 11

– Conformance of the bitstream to the Main 4:4:4 10 profile is indicated by general_max_12bit_constraint_flag equal to 1, general_max_10bit_constraint_flag equal to 1, general_max_422chroma_constraint_flag equal to 0, general_max_420chroma_constraint_flag equal to 0 and general_max_400chroma_constraint_flag equal to 0.

– Conformance of the bitstream to the Main 4:4:4 12 profile is indicated by general_max_12bit_constraint_flag equal to 1, general_max_10bit_constraint_flag equal to 0, general_max_422chroma_constraint_flag equal to 0, general_max_420chroma_constraint_flag equal to 0 and general_max_400chroma_constraint_flag equal to 0.

– Conformance of the bitstream to the High 4:0:0 16 profile is indicated by general_max_16bit_constraint_flag equal to 1, general_max_12bit_constraint_flag equal to 0, general_max_10bit_constraint_flag equal to 0, general_max_422chroma_constraint_flag equal to 0, general_max_420chroma_constraint_flag equal to 0 and general_max_400chroma_constraint_flag equal to 1.

– Conformance of the bitstream to the High 4:4:4 16 profile is indicated by general_max_16bit_constraint_flag equal to 1, general_max_12bit_constraint_flag equal to 0, general_max_10bit_constraint_flag equal to 0, general_max_422chroma_constraint_flag equal to 0, general_max_420chroma_constraint_flag equal to 0 and general_max_400chroma_constraint_flag equal to 0.

FIG. 12

All other combinations of general_max_12bit_constraint_flag, general_max_10bit_constraint_flag, general_max_8bit_constraint_flag, general_max_422chroma_constraint_flag, general_max_420chroma_constraint_flag, general_max_monochrome_constraint_flag and general_max_intra_constraint_flag equal to 0 with general_profile_idc equal to 4 or general_profile_compatibility_flag[ 4 ] equal to 1 are reserved for future use by ITU-T | ISO/IEC. Such combinations shall not be present in bitstreams conforming to this specification. However, decoders conforming to the Main 12, Main 4:2:2 10, Main 4:2:2 12, Main 4:4:4 10, Main 4:4:4 12, High 4:0:0 16 or High 4:4:4 16 profile shall allow other combinations as specified below in this subclause to occur in the bitstream.

Decoders conforming to the Main 12, Main 4:2:2 10, Main 4:2:2 12, Main 4:4:4 10, Main 4:4:4 12, High 4:0:0 16 or High 4:4:4 16 profile at a specific level (identified by a specific value of general_level_idc) shall be capable of decoding all bitstreams for which all of the following conditions apply:

– One or both of the following conditions apply:

– general_profile_idc is equal to 1 or 2, general_profile_compatibility_flag[ 1 ] is equal to 1, general_profile_compatibility_flag[ 2 ] is equal to 1.

– general_profile_idc is equal to 4 or general_profile_compatibility_flag[ 4 ] is equal to 1, and any of the following conditions apply:

FIG. 13

- The decoder conforms to the Main 12 profile, general_max_12bit_constraint_flag is equal to 1, and general_max_422chroma_constraint_flag is equal to 1.
- The decoder conforms to the Main 4:2:2 10 profile, general_max_10bit_constraint_flag is equal to 1, and general_max_422chroma_constraint_flag is equal to 1.
- The decoder conforms to the Main 4:2:2 12 profile, general_max_12bit_constraint_flag is equal to 1 or general_max_10bit_constraint_flag is equal to 1, and general_max_422chroma_constraint_flag is equal to 1 or general_max_420chroma_constraint_flag is equal to 1.
- The decoder conforms to the Main 4:4:4 10 profile and general_max_10bit_constraint_flag is equal to 1.
- The decoder conforms to the Main 4:4:4 12 profile and general_max_12bit_constraint_flag is equal to 1 or general_max_10bit_constraint_flag is equal to 1.
- The decoder conforms to the High 4:0:0 16 profile and general_max_400chroma_constraint_flag is equal to 1.

general_level_idc is not equal to 255 and represents a level lower than or equal to the specified level.

general_tier_flag represents a tier lower than or equal to the specified tier.

FIG. 14

Bitstreams conforming to the Main 12 Intra, Main 4:2:2 12 Intra, Main 4:4:4 12 Intra, High 4:0:0 16 Intra and High 4:4:4 16 Intra profiles shall obey the following constraints:

- In bitstreams conforming to the Main 12 Intra, all constraints specified in subclause 0 for the Main 12 profile shall be obeyed.

- In bitstreams conforming to the Main 4:2:2 12 Intra, all constraints specified in subclause 0 for the Main 4:2:2 12 profile shall be obeyed.

- In bitstreams conforming to the Main 4:4:4 12 Intra, all constraints specified in subclause 0 for the Main 4:4:4 12 profile shall be obeyed.

- In bitstreams conforming to the High 4:0:0 16 Intra, all constraints specified in subclause 0 for the High 4:0:0 16 profile shall be obeyed.

- In bitstreams conforming to the High 4:4:4 16 Intra, all constraints specified in subclause 0 for the High 4:4:4 16 profile shall be obeyed.

- general_intra_constraint_flag shall be equal to 1.

- All pictures shall be IDR picture with nal_unit_type equal to IDR_N_LP.

- When vps_sub_layer_ordering_info_present_flag is equal to 1, vps_max_num_reorder_pics shall be equal to 0.

FIG. 15

- When sps_sub_layer_ordering_info_present_flag is equal to 1, sps_max_num_reorder_pics shall be equal to 0.

- Sequence parameter sets shall have num_short_term_ref_pic_sets equal to 0.

- Sequence parameter sets shall have long_term_ref_pics_present_flag equal to 0.

- Picture timing SEI messages, whether present in the bitstream (by non-VCL NAL units) or conveyed equivalently by other means not specified in this Recommendation | International Standard, shall have pic_dpb_output_delay equal to 0.

The operation of the in-loop filter process specified in subclause is not required for decoder conformance to the Main 12 Intra, Main 4:2:2 12 Intra, Main 4:4:4 12 Intra, High 4:0:0 16 Intra and High 4:4:4 16 Intra profiles.

NOTE – The in-loop filter process specified in subclause 8.7 or some similar post-processing filter should be performed, although this is not a requirement for decoder conformance to the Main 12 Intra, Main 4:2:2 12 Intra, Main 4:4:4 12 Intra and High 4:4:4 16 Intra profiles. The syntax elements sent by an encoder for control of the in-loop filter process specified in subclause 8.7 are considered only as advisory information for decoders conformance to the Main 12 Intra, Main 4:2:2 12 Intra, Main 4:4:4 12 Intra and High 4:4:4 16 Intra profiles. However, the application of the deblocking filter process specified in subclause 8.7 is required for decoder conformance to the Main 12 Intra, Main 4:4:4 12 Intra, Main 4:2:2 12 Intra, Main 4:2:2 12 Intra and High 4:4:4 16 Intra profiles when decoding bitstreams that conform to the Main 12 Intra, Main 4:2:2 12 Intra, Main 4:4:4 12 Intra and High 4:4:4 16 Intra profiles.

FIG. 16

The following is specified for expressing the constraints in this annex.

– Let the variable fR be set equal to 1 ÷ 300.

Bitstreams conforming to the Main, Main 10, Main 12, Main 4:2:2 10, Main 4:2:2 12, Main 4:4:4 10, Main 4:4:4 12, High 4:0:0 16, High 4:4:4 16, Main 12 Intra, Main 4:2:2 12 Intra, Main 4:4:4 12 Intra, High 4:0:0 16 Intra and High 4:4:4 16 Intra profile at a specified tier and level shall obey the following constraints for each bitstream conformance test as specified in Annex C:

IMAGE PROCESSING DEVICE AND METHOD

TECHNICAL FIELD

The present disclosure relates to image processing devices and methods, and more particularly, to an image processing device and a method that can more readily encode and decode a wider variety of images.

BACKGROUND ART

In recent years, standardization of a coding method called High Efficiency Video Coding (HEVC) has been conducted by Joint Collaboration Team-Video Coding (JCTVC), which is a joint standardization organization formed by International Telecommunication Union Telecommunication Standardization Sector (ITU-T) and International Organization for Standardization/International Electrotechnical Commission (ISO/IEC), so as to achieve higher encoding efficiency than MPEG-4 Part 10 (Advanced Video Coding, hereinafter referred to as AVC) (see Non-Patent Document 1, for example).

In HEVC, range extensions are being considered so as to support high-end formats, such as images in chrominance signal formats like 4:2:2 and 4:4:4, and profiles for screen content (see Non-Patent Document 2, for example).

CITATION LIST

Non-Patent Documents

Non-Patent Document 1: Benjamin Bross, Gary J. Sullivan, and Ye-Kui Wang, "Editors' proposed corrections to HEVC version 1", JCTVC-M0432_v3, 2013.4.25

Non-Patent Document 2: David Flynn, Joel Sole, and Teruhiko Suzuki, "High Efficiency Video Coding (HBVC), Range Extension text specification: Draft 4", JCTVC-N1005_v1, 2013.8.8

SUMMARY OF THE INVENTION

Problems to be Solved by the Invention

There is a demand for further profile extensions.

The present disclosure is made in view of those circumstances, and is to enable easier encoding and decoding of a wider variety of images.

Solutions to Problems

One aspect of the present technology lies in an image processing device that includes: a setting unit that sets a parameter indicating a setting state of a coding tool required in specifying an extended profile that is an extension of a profile specified in a coding standard for performing encoding on each unit having a recursive hierarchical structure; and an encoding unit that generates an encoded stream by encoding an image in accordance with the parameter set by the setting unit.

The setting unit may set the parameter as syntax of the encoded stream to be generated by the encoding unit.

The coding tool may include at least one of intra coding, existence/nonexistence of Reorder, a bit rate, and a minimum encoded bit.

The parameter may include general_intra_constraint_flag.

The parameter may further include sub_layer_intra_constraint_flag.

The parameter may include general_max_10bit_constraint_flag and general_max_12bit_constraint_flag.

The parameter may further include sub_layer_max_10bit_constraint_flag and sub_layer_max_12bit_constraint_flag.

The parameter may include general_max_400chroma_constraint_flag, general_max_420chroma_constraint_flag, and general_max_422chroma_constraint_flag.

The parameter may further include sub_layer_max_400chroma_constraint_flag, sub_layer_max_420chroma_constraint_flag, and sub_layer_max_422chroma_constraint_flag.

The parameter may include general_reserved_zero_35bits.

The parameter may further include sub_layer_reserved_zero_35bits [i].

The coding standard may be HEVC Range Extension, which is an extended standard of High Efficiency Video Coding (HEVC)/H.265.

An additional profile to be newly added to the extended profile may include at least one of Main 12 Intra Profile, Main 4:2:2 12 Intra Profile, and Main 4:4:4 12 Intra Profile.

The one aspect of the present technology also lies in an image processing method that includes: setting a parameter indicating a setting state of a coding tool required in specifying an extended profile that is an extension of a profile specified in a coding standard for performing encoding on each unit having a recursive hierarchical structure; and generating an encoded stream by encoding an image in accordance with the parameter set by the setting unit.

Another aspect of the present technology lies in an image processing device that includes:

a parsing unit that parses a parameter from an encoded stream encoded in compliance with a coding standard for encoding an image for each unit having a recursive hierarchical structure, the parameter indicating a setting state of a coding tool required in specifying an extended profile that is an extension of a profile specified in the coding standard; and a decoding unit that decodes the encoded stream by referring to the parameter parsed by the parsing unit.

The parsing unit may parse the parameter as syntax of the encoded stream.

The coding tool may include at least one of intra coding, existence/nonexistence of Reorder, a bit rate, and a minimum encoded bit.

The coding standard may be HEVC Range Extension, which is an extended standard of High Efficiency Video Coding (HEVC)/H.265.

Another aspect of the present technology also lies in an image processing method that includes: parsing a parameter from an encoded stream encoded in compliance with a coding standard for encoding an image for each unit having a recursive hierarchical structure, the parameter indicating a setting state of a coding tool required in specifying an extended profile that is an extension of a profile specified in the coding standard; and decoding the encoded stream by referring to the parsed parameter.

In the one aspect of the present technology, a parameter indicating a setting state of a coding tool required in specifying an extended profile that is an extension of a profile specified in a coding standard for performing encoding on each unit having a recursive hierarchical structure is set, and an encoded stream is generated by encoding an image in accordance with the set parameter.

In another aspect of the present technology, a parameter indicating a setting state of a coding tool required in specifying an extended profile that is an extension of a profile specified in a coding standard for encoding an image for each unit having a recursive hierarchical structure is parsed from an encoded stream encoded in compliance with the coding standard, and the encoded stream is decoded by referring to the parsed parameter.

Effects of the Invention

According to the present disclosure, images can be encoded and decoded. Particularly, a wider variety of images can be encoded and decoded more readily.

BRIEF DESCRIPTION OF DRAWINGS

FIG. 2 is a table showing examples of range extension profiles.

FIG. 3 is a diagram for explaining the features of extended profiles.

FIG. 4 is a diagram for explaining examples of level definitions.

FIG. 5 is a diagram for explaining an example of syntax.

FIG. 6 is a diagram for explaining an example of semantics.

FIG. 7 is a diagram for explaining an example of semantics.

FIG. 8 is a diagram for explaining examples of profile constraints.

FIG. 9 is a diagram for explaining examples of profile constraints.

FIG. 10 is a diagram for explaining examples of profile constraints.

FIG. 11 is a diagram for explaining examples of profile constraints.

FIG. 12 is a diagram for explaining examples of profile constraints.

FIG. 13 is a diagram for explaining examples of profile constraints.

FIG. 14 is a diagram for explaining examples of profile constraints.

FIG. 15 is a diagram for explaining examples of profile constraints.

FIG. 16 is a diagram for explaining examples of profile constraints.

MODES FOR CARRYING OUT THE INVENTION

Figure 1:
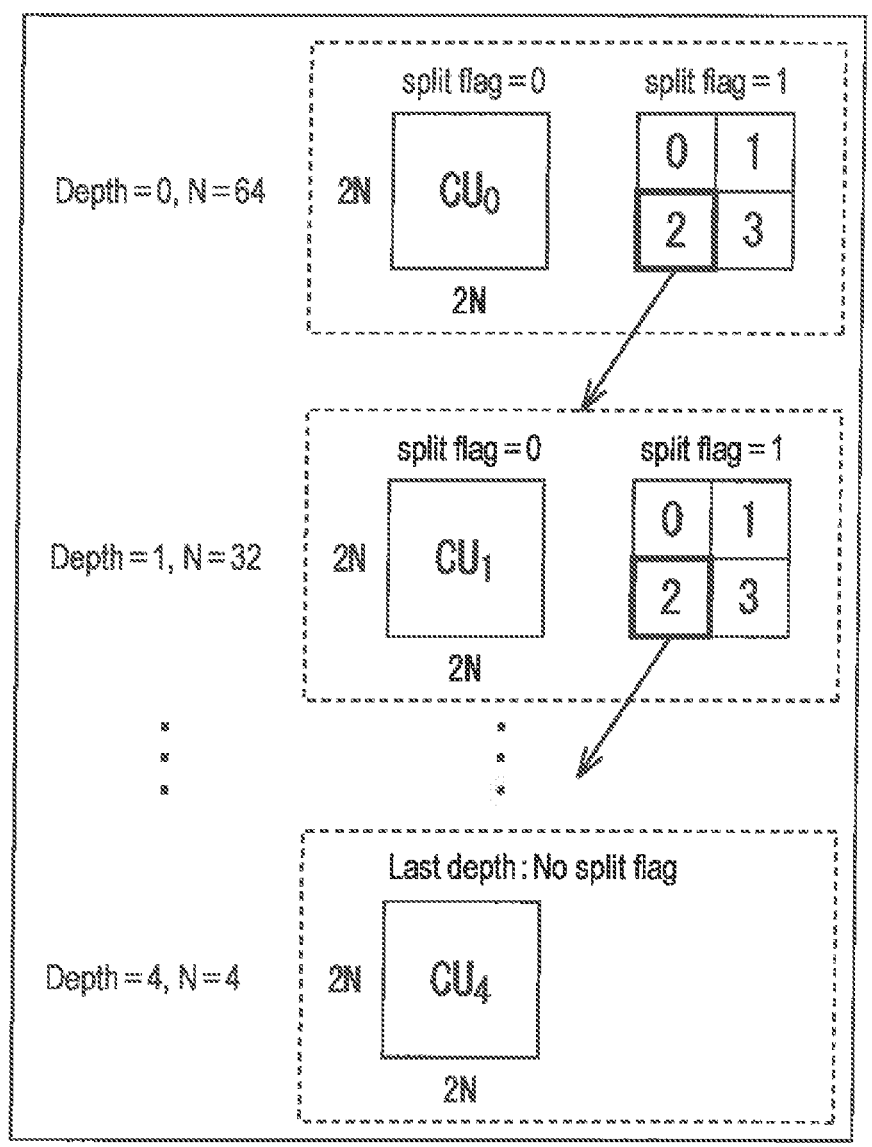
FIG. 1 is a diagram for explaining example structures of coding units.

The following is a description of modes for carrying out the present disclosure (hereinafter referred to as the embodiments). Explanation will be made in the following order.

1. First Embodiment (Profile Extension)
2. Second Embodiment (Encoding Device)
3. Third Embodiment (Decoding Device)
4. Fourth Embodiment (Computer)
5. Fifth Embodiment (Example Applications)
6. Sixth Embodiment (Set, Unit, Module, and Processor)

1. First Embodiment

<Trend of Standardization of Image Encoding>

In recent years, devices compliant with standards such as Moving Picture Experts Group phase (MPEG) for compression to be conducted through orthogonal transform such as discrete cosine transform and motion compensation utilizing the redundancy inherent to image information have been becoming common both in information distribution from broadcasting stations and the like, and in information reception at average households.

Particularly, MPEG2(ISO/IEC 13818-2) is defined as a general-purpose image encoding method. MPEG2 is a standard that specifies both interlaced images and non-interlaced images, standard-resolution images, and high-definition images. MPEG2 is currently used in a wide range of applications for professionals and general consumers. According to MPEG2, a bit rate of 4 to 8 Mbps is assigned to an interlaced image having a standard resolution of 720×480 pixels, and a bit rate of 18 to 22 Mbps is assigned to an interlaced image having a high resolution of 1920× 1088 pixels, for example. In this manner, high compression rates and excellent image quality can be realized.

MPEG2 is designed mainly for high-quality image encoding suited for broadcasting, but is not compatible with lower bit rates than MPEG1 or encoding methods involving higher compression rates. As mobile terminals are becoming popular, the demand for such encoding methods is expected to increase in the future, and to meet the demand, the MPEG4 encoding method was standardized. As for the MPEG4 image encoding method, the ISO/IEC 14496-2 standard was approved as an international standard in December 1998.

Further, a standard called H.26L (ITU-T Q6/16 VCEG) is recently being developed for encoding images to be used in video conferences and the like. Compared with encoding methods such as MPEG2 and MPEG4, H.26L requires a larger amount of calculation in encoding and decoding, but is known to achieve higher encoding efficiency.

In recent years, as part of the activities of MPEG4, standardization to employ functions not supported by H.26L and realize higher encoding efficiency has been conducted as Joint Model of Enhanced-Compression Video Coding on the basis of H.26L. This standardization was approved as an international standard under the name of H.264 and MPEG-4 Part 10 Advanced Video Coding (AVC) in March 2003.

As an extension of the above, Fidelity Range Extension (FRExt) was standardized in February 2005. FRExt includes necessary coding tools for business use, such as the chrominance signal formats of RGB, 4:2:2, and 4:4:4, and the 8×8 Discrete Cosine Transform (DCT) and quantization matrix specified in MPEG2. As a result, an encoding method for enabling excellent presentation of movies containing film noise was realized by using AVC, and the encoding method is now used in a wide range of applications such as Blu-ray (a registered trade name) Disc (BD).

However, there is an increasing demand for encoding at a higher compression rate so as to compress images having a resolution of about 4000×2000 pixels, which is four times higher than the high-definition image resolution, or distribute high-definition images in today's circumstances where transmission capacities are limited as in the Internet. Therefore, studies on improvement in encoding efficiency are still continued by Video Coding Expert Group (VCEG) under ITU-T.

At present, to achieve higher encoding efficiency than that of AVC, an encoding method called High Efficiency Video Coding (HEVC) is being developed as a standard by Joint Collaboration Team-Video Coding (JCTVC), which is a joint standardization organization formed by ITU-T and ISO/IEC. As of October 2013, Non-Patent Document 1 has been issued as a draft.

<Encoding Method>

The present technology is described below in conjunction with an example case where HEVC is applied to image encoding and decoding.

<Coding Unit>

By AVC method a hierarchical structure formed with macroblocks and sub macroblocks is specified. However, macroblocks of 16×16 pixels are not optimal for large frames of Ultra High Definition (UHD; 4000 pixels×2000 pixels) that are subject to next-generation encoding methods.

By HEVC, coding units (CU) are specified as shown in FIG. 1.

CUs are also called Coding Tree Blocks (CTB), and are partial regions of picture-based images that have the same roles as those of macroblocks compliant with AVC. While the size of the latter is limited to 16×16 pixels, the size of the former is not limited to a certain size, and may be designated by the compressed image information in each sequence.

For example, in a sequence parameter set (SPS) contained in encoded data to be output, the largest coding unit (LCU) and the smallest coding unit (SCU) of the CUs are specified.

In each LCU, split-flag=1 is set within a range not smaller than the SCU size, so that each LCU can be divided into CUs of a smaller size. In the example shown in FIG. 1, the size of the LCU is 128, and the greatest hierarchical depth is 5. When the value of split_flag is "1", a CU of 2N×2N in size is divided into CUs of N×N in size, which is one hierarchical level lower. That is, CUs have recursive hierarchical structures.

Each of the CUs is further divided into prediction units (PU) that are processing-unit regions (partial regions of picture-based images) for intra or inter predictions, or are divided into transform units (TU) that are processing-unit regions (partial regions of picture-based images) for orthogonal transforms. At present, 16×16 and 32×32 orthogonal transforms, as well as 4×4 and 8×8 orthogonal transforms, can be used according to HEVC.

In the case of an encoding method of defining CUs and performing various kinds of processing on a CU basis as in HEVC described above, the macroblocks compliant with AVC can be considered equivalent to LCUs, and blocks (sub blocks) can be considered equivalent to the CUs. Also, motion compensation blocks according to AVC can be considered equivalent to PUs. However, a CU has a hierarchical structure. Therefore, the size of LCUs on the highest hierarchical level is normally as large as 128×128 pixels, which is larger than the size of a macroblock compliant with AVC, for example.

In view of the above, LCUs also include macroblocks according to AVC, and CUs also include blocks (sub blocks) according to AVC in the description below. That is, a "block" used in the description below means a partial region in a picture, and the size, the shape, the characteristics, and the like thereof are not particularly limited. That is, "blocks" include any regions (processing units) such as TUs, PUs, SCUs, CUs, LCUs, sub blocks, macroblocks, or slices. Partial regions (processing units) other than the above are of course also included. If there is the need to limit sizes, processing units, and the like, explanation to that effect will be provided.

In this specification, a Coding Tree Unit (CTU) is a unit that includes a CTB of the largest number of CUs (LCU) and the parameters for processing on an LCU basis (level). The CUs constituting the CTU are units including Coding Blocks (CBs) and the parameters for processing on a CU basis (level).

<Mode Selection>

To achieve higher encoding efficiency with the AVC and HEVC encoding methods, it is critical to select an appropriate prediction mode.

Methods implemented in reference software of H.264/MPEG-4 AVC, called Joint Model (JM) (available at http://iphome.hhi.de/suehring/tml/index.htm), can be used as examples of such selection methods.

In JM, the two mode determination methods described below, High Complexity Mode and Low Complexity Mode, can be selected. By either of the methods, a cost function value as to each prediction mode is calculated, and the prediction mode that minimizes the cost function value is selected as the optimum mode for the block or macroblock.

A cost function in High Complexity Mode is expressed as in the following expression (1).

[Mathematical Formula 1]

$$\text{Cost}(\text{Mode} \in \Omega) = D + \Lambda * R \tag{1}$$

Here, $\Omega$ represents the universal set of candidate modes for encoding the block or macroblock, and D represents the difference energy between a decoded image and an input image when encoding is performed in the current prediction mode. $\Lambda$ represents the Lagrange's undetermined multiplier provided as a quantization parameter function. R represents the total bit rate in a case where encoding is performed in the current mode, including the orthogonal transform coefficient.

That is, to perform encoding in High Complexity Mode, a provisional encoding process needs to be performed in all the candidate modes to calculate the above parameters D and R, and therefore, a larger amount of calculation is required.

A cost function in Low Complexity Mode is expressed as in the following expression (2).

[Mathematical Formula 2]

$$\text{Cost}(\text{Mode} \in \Omega) = D + QP2\text{Quant}(QP) * \text{HeaderBit} \qquad (2)$$

Here, D differs from that in High Complexity Mode, and represents the difference energy between a predicted image and an input image. QP2Quant(QP) represents a function of a quantization parameter QP, and HeaderBit represents the bit rate related to information that excludes the orthogonal transform coefficient and belongs to Header, such as motion vectors and the mode.

That is, in Low Complexity Mode, a prediction process needs to be performed for each of the candidate modes, but a decoded image is not required. Therefore, there is no need to perform an encoding process. Accordingly, the amount of calculation is smaller than that in High Complexity Mode.

<Profile Extensions>

In HEVC, range extensions are being considered so as to support high-end formats, such as images in chrominance signal formats like 4:2:2 and 4:4:4, and profiles for screen content, as disclosed in Non-Patent Document 2.

As the image processing technologies have improved in recent years, the importance of the high-end formats becomes even higher. In an image encoding/decoding method such as HEVC, there is a strong demand for further support of high-end formats.

Therefore, further extensions of profiles have been considered. In view of interoperability, it is preferable to extend profiles, and define specifications so as to support all the conceivable use cases. However, if too many profiles are defined, handling them becomes difficult, resulting in an adverse effect.

Therefore, profiles are extended as shown in the table in FIG. 2. Profiles that have been considered for range extensions are profiles for the 4:2:0 format of a bit depth of 12 bits (Main 12 4:2:0), the 4:2:2 format of a bit depth of 10 bits (Main 10 4:2:2), the 4:2:2 format of a bit depth of 12 bits (Main 12 4:2:2), the 4:4:4 format of a bit depth of 10 bits (Main 10 4:4:4), and the 4:4:4 format of a bit depth of 12 bite (Main 12 4:4:4). However, profiles such as High 4:0:0 16 Profile, High 4:4:4 16 Profile, Main 12 Intra Profile, Main 4:2:2 12 Intra Profile, Main 4:4:4 12 Intra Profile, High 4:0:0 16 Intra Profile, and High 4:4:4 16 Intra Profile are further set, as shown in FIG. 2. That is, the coding standard may be HEVC/H.265, and the additional profiles to be newly added to the extended profiles include at least one of High 4:0:0 16 Profile, High 4:4:4 16 Profile, Main 12 Intra Profile, Main 4:2:2 12 Intra Profile, Main 4:4:4 12 Intra Profile, High 4:0:0 16 Intra Profile, and High 4:4:4 16 Intra Profile.

FIG. 3 shows the features of new profiles. The levels of the respective profiles are defined as shown in the table in A in FIG. 4. B in FIG. 4 may be applied in the case of AVC.

<Identification Data>

As profiles are extended as above, it becomes possible to cope with high-end formats. However, to perform correct decoding, the decoding side needs to obtain information about such extended profiles.

Therefore, identification data identifying an extended profile that is an extension of a profile specified in a coding standard for performing encoding on each unit having a recursive hierarchical structure is set as syntax of an encoded stream generated by encoding an image in compliance with the coding standard. In this manner, information about the extended profile can be transferred to the decoding side. Accordingly, the decoding side can readily perform correct decoding on encoded data. That is, a wider variety of images can be encoded or decoded more readily in the above manner.

A parameter indicating a setting state of a coding tool required in specifying the extended profile may also be set as syntax of the encoded stream. The coding tool may include at least one of intra coding, existence/nonexistence of Reorder, a bit rate, and a minimum encoded bit, for example. With this, the decoding side can more readily set an appropriate value as the parameter of the coding tool by referring to the syntax, and can more readily perform appropriate decoding on encoded data.

<Syntax and Semantics>

FIG. 5 shows an example of the syntax of profile_tier_level. FIGS. 6 and 7 show examples of the semantics of the respective syntax elements. As shown in FIG. 5, the above described identification data identifying an extended profile may be set as profile_tier_level( ). In this manner, the decoding side can more readily obtain this identification data, and readily perform correct decoding on encoded data based on the identification data. That is, a wider variety of images can be encoded or decoded more readily in the above manner.

As shown in FIG. 5, information such as general_intra_constraint_flag, general_max_10bit_constraint_flag, general_max_12bit_constraint_flag, general_max_16bit_constraint_flag, general_reserved_zero_2bits, general_max_400chroma_constraint_flag, general_max_420chroma_constraint_flag, general_max_422chroma_constraint_flag, and general_reserved_zero_35bits may be transmitted as the parameter indicating the setting unit of the coding tool. That is, this parameter may include at least one of general_intra_constraint_flag, general_max_10bit_constraint_flag, general_max_12bit_constraint_flag, general_max_16bit_constraint_flag, general_reserved_zero_2bits, general_max_400chroma_constraint_flag, general_max_420chroma_constraint_flag, general_max_422chroma_constraint_flag, and general_reserved_zero_35bits.

Also, as shown in FIG. 5, information such as sub_layer_intra_constraint_flag, sub_layer_max_10bit_constraint_flag, sub_layer_max_12bit_constraint_flag, sub_layer_max_16bit_constraint_flag, sub_layer_reserved_zero_2bits, sub_layer_max_400chroma_constraint_flag, sub_layer_max_420chroma_constraint_flag, sub_layer_max_422chroma_constraint_flag, and sub_layer_reserved_zero_35bits[i] may be transmitted as the parameter indicating the setting unit of the coding tool. That is, this parameter may include at least one of sub_layer_intra_constraint_flag, sub_layer_max_10bit_constraint_flag, sub_layer_max_12bit_constraint_flag, sub_layer_max_16bit_constraint_flag, sub_layer_reserved_zero_2bits, sub_layer_max_400chroma_constraint_flag,
sub_layer_max_420chroma_constraint_flag,
sub_layer_max_422chroma_constraint_flag, and sub_layer_reserved_zero_35bits [i].

It should be noted that the respective profiles including the additional profiles (such as High 4:0:0 16 Profile, High 4:4:4 16 Profile, Main 12 Intra Profile, Main 4:2:2 12 Intra Profile, Main 4:4:4 12 Intra Profile, High 4:0:0 16 Intra Profile, and High 4:4:4 16 Intra Profile) to be newly added to the extended profiles described above with reference to FIG. 2 are under the constraints specified in FIGS. 8 through 16.

2. Second Embodiment

<Encoding Device>

Figure 17:
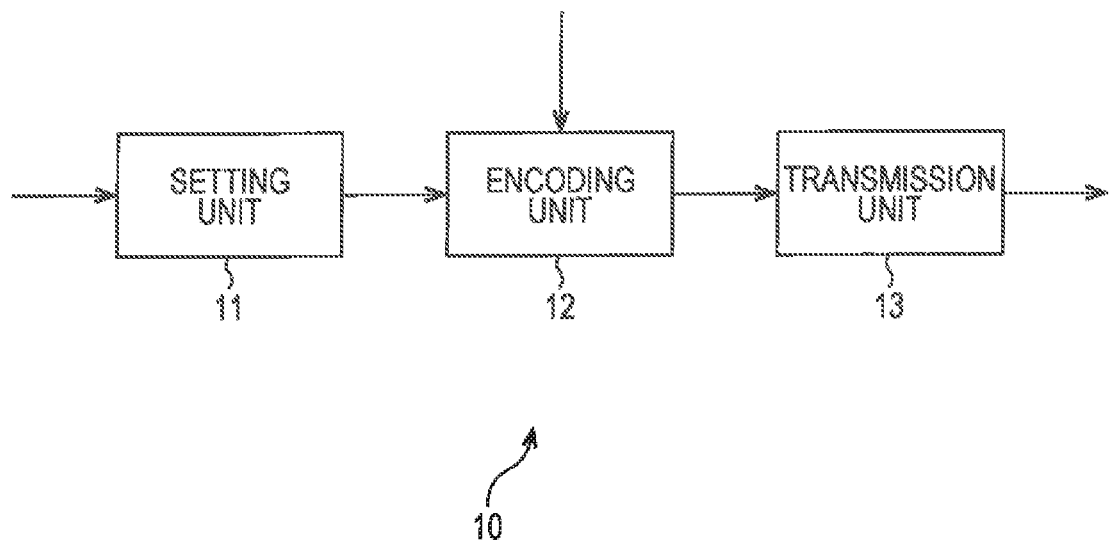
FIG. 17 is a block diagram showing a typical example structure of an embodiment of an encoding device to which the present technology is applied.

Next, a device that realizes the present technology described above, and the method of the realization are described. FIG. 17 is a diagram showing an encoding device that is an embodiment of an image processing device to which the present technology is applied. The encoding device 10 shown in FIG. 17 includes a setting unit 11, an encoding unit 12, and a transmission unit 13, and encodes images by a method compliant with HEVC.

Specifically, the setting unit 11 of the encoding device 10 sets parameter sets such as an Sequence Parameter Set (SPS), a Picture Parameter Set (PPS), Video Usability Information (VUI), and Supplemental Enhancement Information (SRI). The setting unit 11 also sets a profile of encoding for an input image based on the image, and sets identification data (as profile_tier_level( ), for example) for identifying a profile extended for a profile specified in the coding standard. For example, the setting unit 11 generates the identification data described in the first embodiment. The setting unit 11 supplies the parameter sets and the identification data to the encoding unit 12.

A frame-based image is input to the encoding unit 12. Based on the parameter sets and the identification data supplied from the setting unit 11, the encoding unit 12 encodes an input image by a method compliant with HEVC. The encoding unit 12 generates an encoded stream using the encoded data obtained as a result of the encoding, and the parameter set and the identification data associated with the encoded data, and supplies the encoded stream to the transmission unit 13.

The transmission unit 13 transmits the encoded stream supplied from the encoding unit 12 to the decoding device, which will be described later.

<Encoding Unit>

Figure 18:
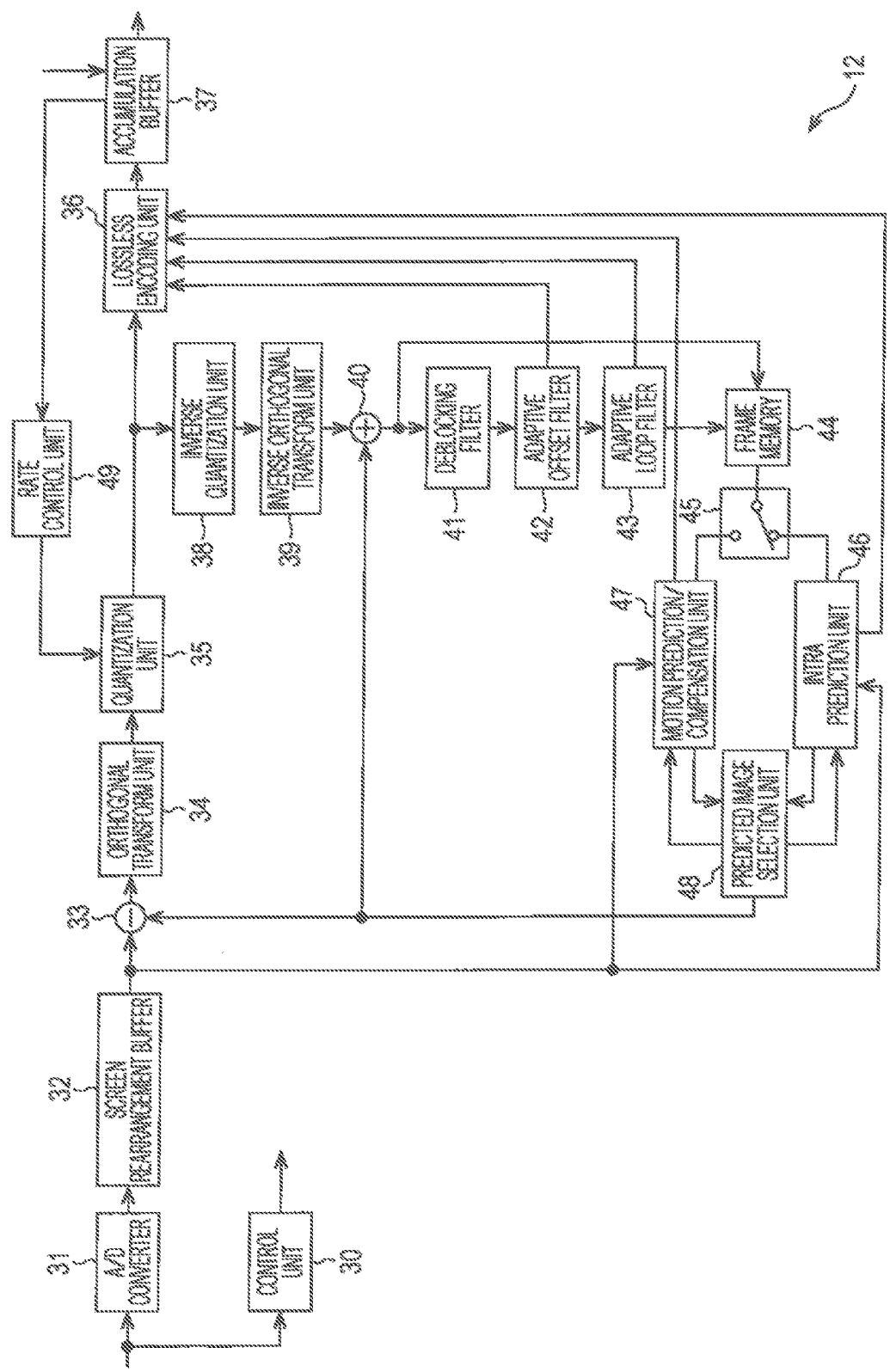
FIG. 18 is a block diagram showing a typical example structure of an encoding unit.

FIG. 18 is a block diagram showing a typical example structure of the encoding unit 12 shown in FIG. 17.

The encoding unit 12 shown in FIG. 18 includes a control unit 30, an A/D converter 31, a screen rearrangement buffer 32, an arithmetic operation unit 33, an orthogonal transform unit 34, a quantization unit 35, a lossless encoding unit 36, an accumulation buffer 37, an inverse quantization unit 38, an inverse orthogonal transform unit 39, and an addition unit 40. The encoding unit 12 also includes a deblocking filter 41, an adaptive offset filter 42, an adaptive loop filter 43, a frame memory 44, a switch 45, an intra prediction unit 46, a motion prediction/compensation unit 47, a predicted image selection unit 48, and a rate control unit 49.

The control unit 30 of the encoding unit 12 appropriately controls the respective components of the encoding unit 12 based on the identification data (profile_tier_level( ), for example) supplied from the setting unit 11 for identifying the extended profile. That is, the control unit 30 supplies the respective components with the parameter indicating the setting state of the coding tool required for specifying the extended profile indicated by the identification data, to control operations of the respective components so that encoding is performed in accordance with the extended profile. Although not explained in the description below, the respective components operate under the control of the control unit 30.

The A/D converter 31 performs A/D conversion on a frame-based image that is input as an object to be encoded. The A/D converter 31 outputs an image that is a converted digital signal to the screen rearrangement buffer 32, and stores the image into the screen rearrangement buffer 32.

The screen rearrangement buffer 32 rearranges the frames of the image stored in displaying order, so that the frames of the image are arranged in encoding order in accordance with the GOP structure. The screen rearrangement buffer 32 supplies the rearranged image to the arithmetic operation unit 33, the intra prediction unit 46, and the motion prediction/compensation unit 47.

The arithmetic operation unit 33 performs encoding by subtracting a predicted image supplied from the predicted image selection unit 48 from the image supplied from the screen rearrangement buffer 32. The arithmetic operation unit 33 outputs the resultant image as residual error information (a difference) to the orthogonal transform unit 34. When any predicted image is not supplied from the predicted image selection unit 48, the arithmetic operation unit 33 outputs an image read from the screen rearrangement buffer 32 as residual error information to the orthogonal transform unit 34.

The orthogonal transform unit 34 performs orthogonal transform on the residual error information supplied from the arithmetic operation unit 33 in compliance with HEVC. The orthogonal transform unit 34 supplies the orthogonal transform coefficient obtained as a result of the orthogonal transform to the quantization unit 35.

The quantization unit 35 quantizes the orthogonal transform coefficient supplied from the orthogonal transform unit 34. The quantization unit 35 supplies the quantized orthogonal transform coefficient to the lossless encoding unit 36.

The lossless encoding unit 36 acquires, from the intra prediction unit 46, information indicating the optimum intra prediction mode (the information will be hereinafter referred to as the intra prediction mode information). The lossless encoding unit 36 also acquires, from the motion prediction/compensation unit 47, information indicating the optimum inter prediction mode (the information will be hereinafter referred to as the inter prediction mode information), a motion vector, information for identifying a reference image, and the like.

The lossless encoding unit 36 also acquires offset filter information about an offset filter from the adaptive offset filter 42, and acquires a filter coefficient from the adaptive loop filter 43.

The lossless encoding unit 36 performs lossless encoding, such as variable-length encoding (Context-Adaptive Variable Length Coding (CAVLC), for example) or arithmetic encoding (Context-Adaptive Binary Arithmetic Coding (CABAC), for example), on the quantized orthogonal transform coefficient supplied from the quantization unit 35.

The lossless encoding unit 36 also performs lossless encoding on encoding information related to encoding, which is various kinds of information related to encoding, such as the intra prediction mode information or the inter prediction mode information, the motion vector, the information for identifying the reference image, the offset filter information, and the filter coefficient. The lossless encoding unit 36 supplies the accumulation buffer 37 with the encoding information and the orthogonal transform coefficient subjected to the lossless encoding as encoded data to be stored. The encoding information subjected to the lossless encoding may be header information (a slice header) about the orthogonal transform coefficient subjected to the lossless encoding.

The accumulation buffer 37 temporarily stores the encoded data supplied from the lossless encoding unit 36. The accumulation buffer 37 also supplies the stored encoded data, together with the parameter set and the identification data supplied from the setting unit 11 shown in FIG. 17, as an encoded stream to the transmission unit 13.

The quantized orthogonal transform coefficient that is output from the quantization unit 35 is also input to the inverse quantization unit 38. According to a method corresponding to the quantization method used in the quantization unit 35, the inverse quantization unit 38 inversely quantizes the orthogonal transform coefficient quantized by the quantization unit 35. The inverse quantization unit 38 supplies the orthogonal transform coefficient obtained as a result of the inverse quantization to the inverse orthogonal transform unit 39.

The inverse orthogonal transform unit 39 performs inverse orthogonal transform on the orthogonal transform coefficient supplied from the inverse quantization unit 38, in compliance with HEVC. The inverse orthogonal transform unit 39 supplies the residual error information obtained as a result of the inverse orthogonal transform to the addition unit 40.

The addition unit 40 adds the residual error information supplied from the inverse orthogonal transform unit 39 to the predicted image supplied from the predicted image selection unit 48, to perform decoding. The addition unit 40 supplies the decoded image to the deblocking filter 41 and the frame memory 44.

The deblocking filter 41 performs an adaptive deblocking filtering process on the decoded image supplied from the addition unit 40, to remove block distortion. The resultant image is supplied to the adaptive offset filter 42.

The adaptive offset filter 42 performs an adaptive offset filtering (Sample Adaptive Offset (SAO)) process on the image subjected to the adaptive deblocking filtering process by the deblocking filter 41, mainly to remove ringing.

Specifically, the adaptive offset filter 42 determines a type of an adaptive offset filtering process for each Largest Coding Unit (LCU) as the largest unit of encoding, and calculates the offset to be used in the adaptive offset filtering process. Using the calculated offset, the adaptive offset filter 42 performs the adaptive offset filtering process of the determined type on the image subjected to the adaptive deblocking filtering process.

The adaptive offset filter 42 supplies the adaptive loop filter 43 with the image subjected to the adaptive offset filtering process. The adaptive offset filter 42 also supplies the lossless encoding unit 36 with the offset filter information, which is information indicating the type of the performed adaptive offset filtering process and the offset.

The adaptive loop filter 43 is formed with a two-dimensional Wiener filter, for example. For each LCU, for example, the adaptive loop filter 43 performs an adaptive loop filtering (ALF) process on the image that is supplied from the adaptive offset filter 42 and has been subjected to the adaptive offset filtering process.

Specifically, for each LCU, the adaptive loop filter 43 calculates the filter coefficient to be used in the adaptive loop filtering process, so as to minimize the residual error between the original image that is the image output from the screen rearrangement buffer 32 and the image subjected to the adaptive loop filtering process. Using the calculated filter coefficient, the adaptive loop filter 43 performs, for each LCU, the adaptive loop filtering process on the image subjected to the adaptive offset filtering process.

The adaptive loop filter 43 supplies the frame memory 44 with the image subjected to the adaptive loop filtering process. The adaptive loop filter 43 also supplies the lossless encoding unit 36 with the filter coefficient used in the adaptive loop filtering process.

Although the adaptive loop filtering process is performed for each LCU in this example, the unit of processing in the adaptive loop filtering process is not limited to LCU. However, processing can be efficiently performed where the adaptive offset filter 42 and the adaptive loop filter 43 use the same unit of processing.

The frame memory 44 stores the image supplied from the adaptive loop filter 43 and the image supplied from the addition unit 40. An image adjacent to a PU among the images that are stored in the frame memory 44 and have not been subjected to any filtering process is supplied as a peripheral image to the intra prediction unit 46 via the switch 45. Meanwhile, an image that is stored in the frame memory 44 and has been subjected to a filtering process is output as a reference image to the motion prediction/compensation unit 47 via the switch 45.

Using the peripheral image that has been read from the frame memory 44 via the switch 45, the intra prediction unit 46 performs an intra prediction process in all candidate intra prediction modes for each PU.

Based on an image read from the screen rearrangement buffer 32 and the predicted image generated as a result of the intra prediction process, the intra prediction unit 46 calculates cost function values (described later in detail) of all the candidate intra prediction modes. The intra prediction unit 46 then determines the optimum intra prediction mode that is the intra prediction mode with the smallest cost function value.

The intra prediction unit 46 supplies the predicted image generated in the optimum intra prediction mode and the corresponding cost function value to the predicted image selection unit 48. When notified of the selection of the predicted image generated in the optimum intra prediction mode by the predicted image selection unit 48, the intra prediction unit 46 supplies the intra prediction mode information to the lossless encoding unit 36.

The motion prediction/compensation unit 47 performs a motion prediction/compensation process in all candidate inter prediction modes for each PU. Specifically, the motion prediction/compensation unit 47 detects, for each PU, motion vectors of all the candidate inter prediction modes based on the image supplied from the screen rearrangement buffer 32 and the reference image read from the frame memory 44 via the switch 45. The motion prediction/compensation unit 47 then performs, for each PU, a compensation process on the reference image based on the motion vectors, and generates predicted images.

At this point, the motion prediction/compensation unit 47 calculates cost function values of all the candidate inter prediction modes based on the image supplied from the screen rearrangement buffer 32 and the predicted images, and determines the optimum inter prediction mode that is the inter prediction mode with the smallest cost function value. The motion prediction/compensation unit 47 then supplies the cost function value of the optimum inter prediction mode and the corresponding predicted image to the predicted image selection unit 48. When notified of the selection of the predicted image generated in the optimum inter prediction mode by the predicted image selection unit 48, the motion prediction/compensation unit 47 outputs the inter prediction mode information, the corresponding motion vector, the information for identifying the reference image, and the like to the lossless encoding unit 36.

Based on the cost function values supplied from the intra prediction unit 46 and the motion prediction/compensation unit 47, the predicted image selection unit 48 determines the optimum prediction mode that is the optimum intra prediction mode or the optimum inter prediction mode, whichever has the smaller cost function value. The predicted image selection unit 48 then supplies the predicted image in the optimum prediction mode to the arithmetic operation unit 33 and the addition unit 40. The predicted image selection unit 48 also notifies the intra prediction unit 46 or the motion prediction/compensation unit 47 of the selection of the predicted image in the optimum prediction mode.

Based on the encoded data stored in the accumulation buffer 37, the rate control unit 49 controls the quantization operation rate of the quantization unit 35 so as not to cause an overflow or underflow.

As described above, the encoding device 10 generates an encoded stream by performing image encoding in compliance with a coding standard for performing encoding on each unit having recursive hierarchical structures, and sets identification data for identifying an extended profile that is an extension of a profile specified in the coding standard, as the syntax of the encoded stream. Accordingly, a wider variety of images can be more readily encoded, and the decoding side can be made to decode the images.

<Flow in a Stream Generation Process>

Next, the flow in a process to be performed by the above described encoding device 10 is described. Referring first to the flowchart in FIG. 19, an example flow in a stream generation process is described.

Figure 19:
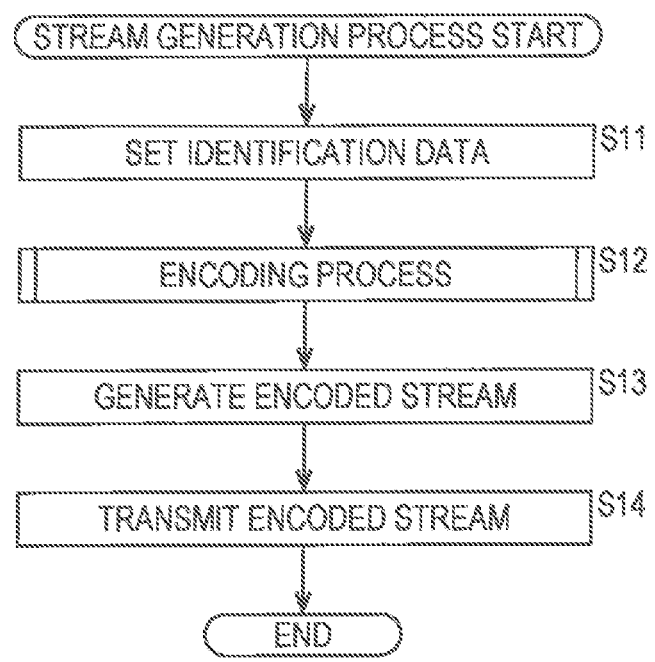
FIG. 19 is a flowchart for explaining a stream generation process.

When a stream generation process is started, the setting unit 11 of the encoding device 10 in step S11 in FIG. 19 sets a profile of encoding for an input image based on the image, and sets identification data for identifying an extended profile. The setting unit 11 also sets various kinds of parameter sets.

In step S12, based on the identification data set in step S11, the encoding unit 12 performs an encoding process to encode a frame-based image input from the outside by a method compliant to HEVC. This encoding process will be described later in detail, with reference to FIGS. 20 and 21.

In step S13, the accumulation buffer 37 (FIG. 18) of the encoding unit 12 generates an encoded stream from the parameter sets, identification data, stored encoded data, and the like supplied from the setting unit 11.

In step S14, the transmission unit 13 transmits the encoded stream generated in step S13 to the decoding device, which will be described later, and the process comes to an end.

<Flow in the Encoding Process>

Figure 20:
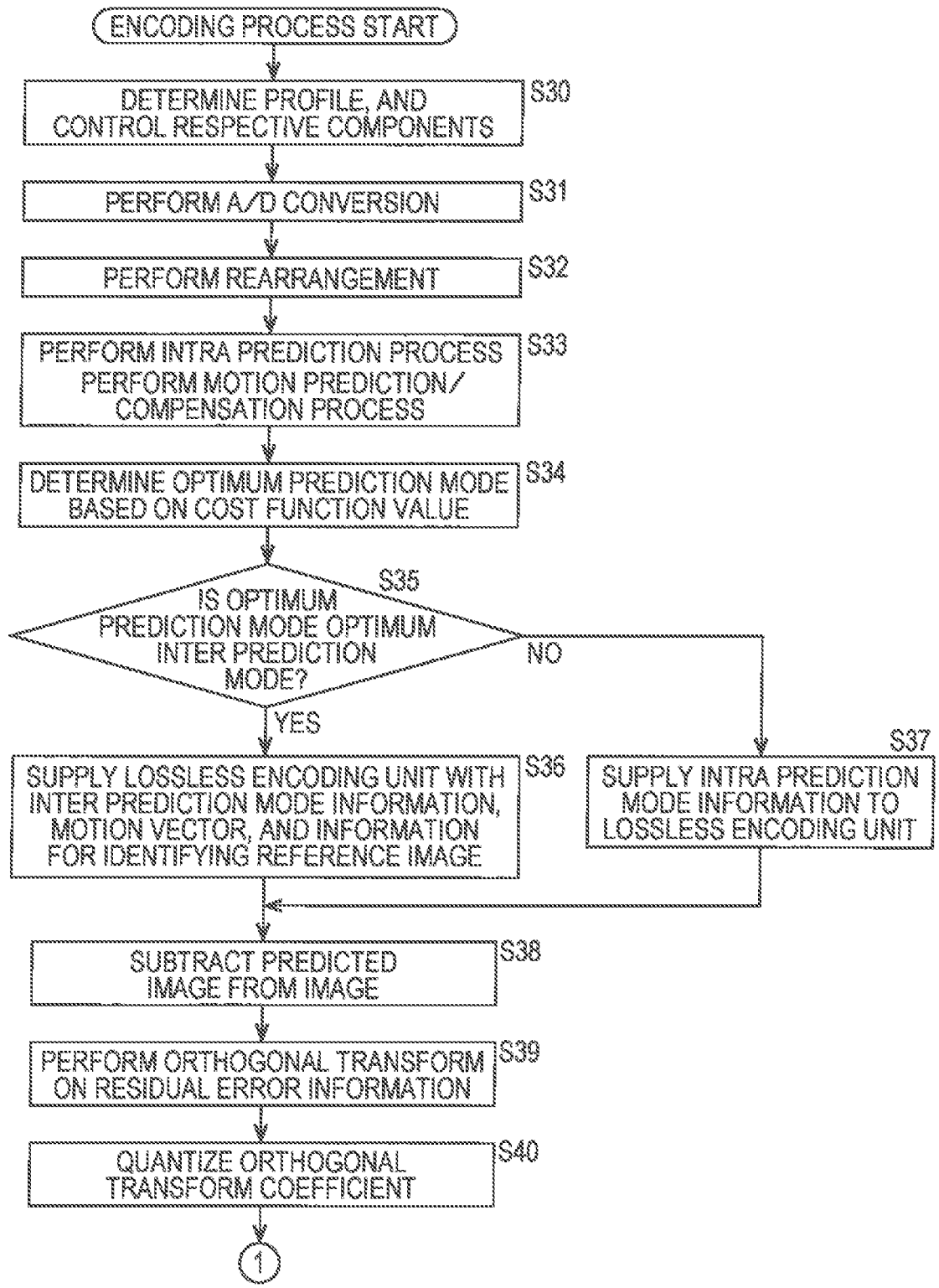
FIG. 20 is a flowchart for explaining an encoding process in detail.
Figure 21:
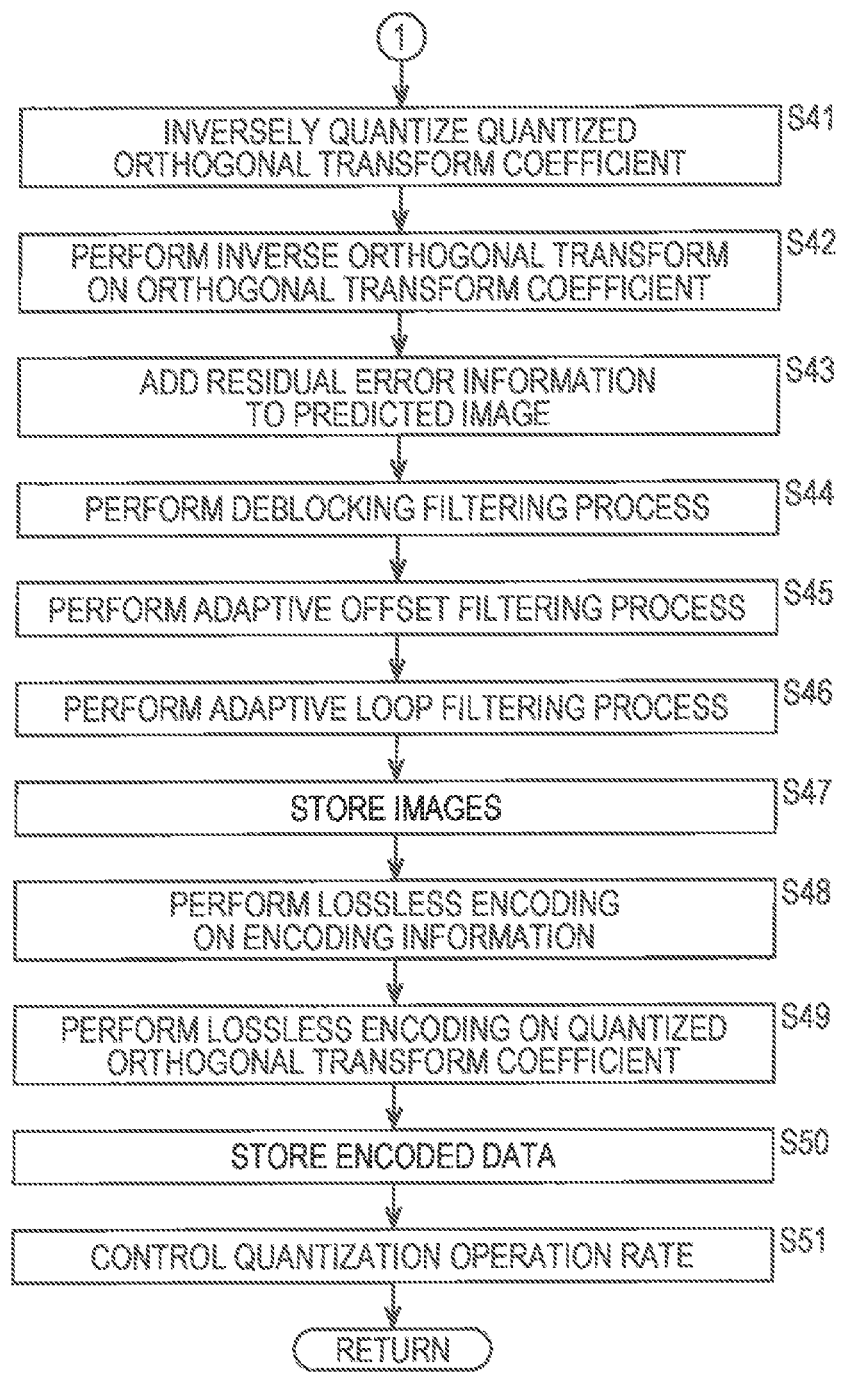
FIG. 21 is a flowchart continuing from FIG. 15, for explaining the encoding process in detail.

FIGS. 20 and 21 are flowcharts for explaining in detail the encoding process of step S12 shown in FIG. 19.

In step S30 in FIG. 20, the control unit 30 (FIG. 18) of the encoding unit 12 determines a profile of encoding for an frame-based image input as an object to be encoded based on the identification data set in step S11, and supplies, to the respective components, parameters indicating the setting state of the coding tool required for specifying the profile. By doing so, the control unit 30 controls the respective components so that encoding is performed in accordance with the profile.

In step S31, the A/D converter 31 performs A/D conversion on a frame-based image that is input as an object to be encoded. The A/D converter 31 outputs an image that is a converted digital signal to the screen rearrangement buffer 32, and stores the image into the screen rearrangement buffer 32.

In step S32, the screen rearrangement buffer 32 rearranges the frames of the image stored in displaying order, so that the frames of the image are arranged in encoding order in accordance with the GOP structure. The screen rearrangement buffer 32 supplies the rearranged frame-based image to the arithmetic operation unit 33, the intra prediction unit 46, and the motion prediction/compensation unit 47.

In step S33, the intra prediction unit 46 performs an intra prediction process in all candidate intra prediction modes for each PU. Based on the image read from the screen rearrangement buffer 32 and the predicted images generated as a result of the intra prediction process, the intra prediction unit 46 calculates cost function values of all the candidate intra prediction modes. The intra prediction unit 46 then determines the optimum intra prediction mode that is the intra prediction mode with the smallest cost function value. The intra prediction unit 46 supplies the predicted image generated in the optimum intra prediction mode and the corresponding cost function value to the predicted image selection unit 48.

Meanwhile, the motion prediction/compensation unit 47 performs a motion prediction/compensation process in all candidate inter prediction modes for each PU. The motion prediction/compensation unit 47 also calculates cost function values of all the candidate inter prediction modes based on the image supplied from the screen rearrangement buffer 32 and the predicted images, and determines the optimum inter prediction mode that is the inter prediction mode with the smallest cost function value. The motion prediction/compensation unit 47 then supplies the cost function value of the optimum inter prediction mode and the corresponding predicted image to the predicted image selection unit 48.

In step S34, based on the cost function values supplied from the intra prediction unit 46 and the motion prediction/compensation unit 47 through the procedure in step S33, the predicted image selection unit 48 determines the optimum prediction mode that is the optimum intra prediction mode or the optimum inter prediction mode, whichever has the smaller cost function value. The predicted image selection unit 48 then supplies the predicted image in the optimum prediction mode to the arithmetic operation unit 33 and the addition unit 40.

In step S35, the predicted image selection unit 48 determines whether the optimum prediction mode is the optimum inter prediction mode. If the optimum prediction mode is determined to be the optimum inter prediction mode in step S35, the predicted image selection unit 48 notifies the motion prediction/compensation unit 47 of selection of the predicted image generated in the optimum inter prediction mode.

In step S36, the motion prediction/compensation unit 47 supplies the lossless encoding unit 36 with the inter prediction mode information, the motion vector, and the information for identifying the reference image, and the process moves on to step S38.

If the optimum prediction mode is determined not to be the optimum inter prediction mode in step S35, or if the optimum prediction mode is the optimum intra prediction mode, on the other hand, the predicted image selection unit 48 notifies the intra prediction unit 46 of selection of the predicted image generated in the optimum intra prediction mode. In step S37, the intra prediction unit 46 supplies the intra prediction mode information to the lossless encoding unit 36, and the process moves on to step S38.

In step S38, the arithmetic operation unit 33 performs encoding by subtracting the predicted image supplied from the predicted image selection unit 48 from the image supplied from the screen rearrangement buffer 32. The arithmetic operation unit 33 outputs the resultant image as residual error information to the orthogonal transform unit 34.

In step S39, the orthogonal transform unit 34 performs orthogonal transform on the residual error information for each TU. The orthogonal transform unit 34 supplies the resultant orthogonal transform coefficient to the quantization unit 35.

In step S40, the quantization unit 35 quantizes the orthogonal transform coefficient supplied from the orthogonal transform unit 34, and supplies the quantized orthogonal transform coefficient to the lossless encoding unit 36 and the inverse quantization unit 38.

In step S41 in FIG. 21, the inverse quantization unit 38 inversely quantizes the quantized orthogonal transform coefficient supplied from the quantization unit 35, and supplies the resultant orthogonal transform coefficient to the inverse orthogonal transform unit 39.

In step S42, the inverse orthogonal transform unit 39 performs inverse orthogonal transform on the orthogonal transform coefficient. The inverse orthogonal transform unit 39 supplies the resultant residual error information to the addition unit 40.

In step S43, the addition unit 40 adds the residual error information supplied from the inverse orthogonal transform unit 39 to the predicted image supplied from the predicted image selection unit 48, to perform decoding. The addition unit 40 supplies the decoded image to the deblocking filter 41 and the frame memory 44.

In step S44, the deblocking filter 41 performs a deblocking filtering process on the decoded image supplied from the addition unit 40. The deblocking filter 41 supplies the resultant image to the adaptive offset filter 42.

In step S45, the adaptive offset filter 42 performs, for each LCU, an adaptive offset filtering process on the image supplied from the deblocking filter 41. The adaptive offset filter 42 supplies the resultant image to the adaptive loop filter 43. The adaptive offset filter 42 also supplies the offset filter information to the lossless encoding unit 36 for each LCU.

In step S46, the adaptive loop filter 43 performs, for each LCU, an adaptive loop filtering process on the image supplied from the adaptive offset filter 42. The adaptive loop filter 43 supplies the resultant image to the frame memory 44. The adaptive loop filter 43 also supplies the lossless encoding unit 36 with the filter coefficient used in the adaptive loop filtering process.

In step S47, the frame memory 44 stores the image supplied from the adaptive loop filter 43 and the image supplied from the addition unit 40. An image adjacent to a PU among the images that are stored in the frame memory 44 and have not been subjected to any filtering process is supplied as a peripheral image to the intra prediction unit 46 via the switch 45. Meanwhile, an image that is stored in the frame memory 44 and has been subjected to a filtering process is output as a reference image to the motion prediction/compensation unit 47 via the switch 45.

In step S48, the lossless encoding unit 36 performs lossless encoding on encoding information, which is various kinds of information related to encoding, such as the intra prediction mode information or the inter prediction mode information, the motion vector, the information for identifying the reference image, the offset filter information, and the filter coefficient.

In step S49, the lossless encoding unit 36 performs lossless encoding on the quantized orthogonal transform coefficient supplied from the quantization unit 35. The lossless encoding unit 36 then generates encoded data from the encoding information subjected to the lossless encoding and the orthogonal transform coefficient subjected to the lossless encoding, and supplies the encoded data to the accumulation buffer 37.

In step S50, the accumulation buffer 37 temporarily stores the encoded data supplied from the lossless encoding unit 36.

In step S51, based on the encoded data stored in the accumulation buffer 37, the rate control unit 49 controls the quantization operation rate of the quantization unit 35 so as not to cause an overflow or underflow. The process then returns to step S12 in FIG. 19, and moves on to step S13.

For ease of explanation, the intra prediction process and the motion prediction/compensation process are constantly performed in the encoding process shown in FIGS. 20 and 21. In practice, however, there are cases where only one of the processes is performed depending on a picture type or the like.

By performing the respective processes in the above manner, the encoding device 10 can more readily encode a wider variety of images, and cause the decoding side to decode the images.

3. Third Embodiment

<Decoding Device>

Figure 22:
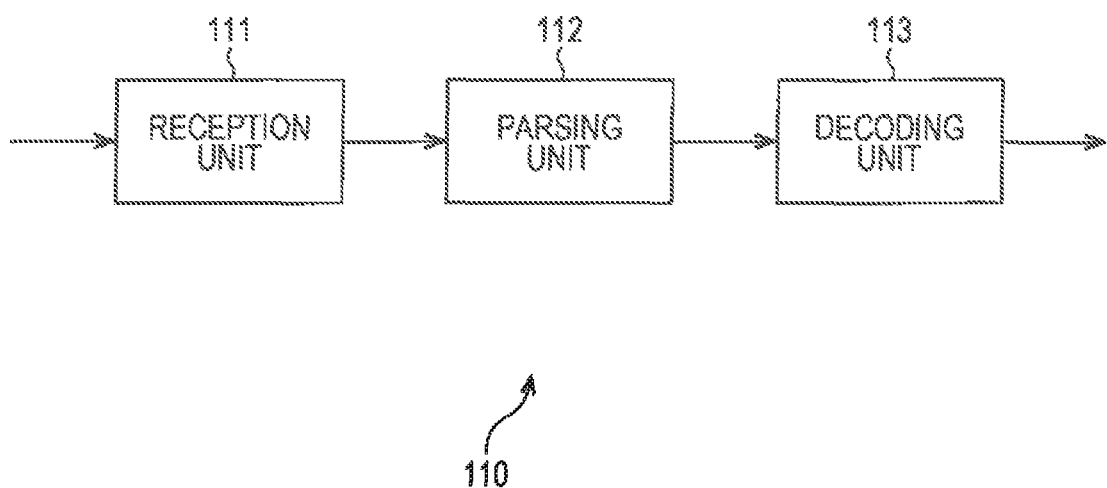
FIG. 22 is a block diagram showing a typical example structure of an embodiment of a decoding device to which the present technology is applied.

Next, decoding of encoded data that is encoded in the above described manner is described. FIG. 22 is a block diagram showing an example structure of a decoding device compatible with the encoding device 10, as an embodiment of an image processing device to which the present technology is applied. The decoding device 110 shown in FIG. 22 decodes encoded data generated by the encoding device 10, by a decoding method compatible with the encoding method. As shown in FIG. 22, the decoding device 110 includes a reception unit 111, a parsing unit 112, and a decoding unit 113.

The reception unit 111 of the decoding device 110 receives an encoded stream transmitted from the encoding device 10, and supplies the encoded stream to the parsing unit 112.

From the encoded stream supplied from the reception unit 111, the parsing unit 112 parses the identification data for identifying an extended profile that is an extension of a profile specified in the coding standard. The parsing unit 112 supplies the parsed identification data to the decoding unit 113. The parsing unit 112 also extracts various kinds of parameter sets and encoded data from the encoded stream, and supplies the parameter sets and the encoded data to the decoding unit 113.

The decoding unit 113 decodes the encoded data supplied from the parsing unit 112, by a method compliant with HEVC. At this point, the decoding unit 113 refers to the parameter sets and the identification data supplied from the parsing unit 112 as necessary. The decoding unit 113 outputs the image obtained as a result of the decoding.

<Decoding Unit>

Figure 23:
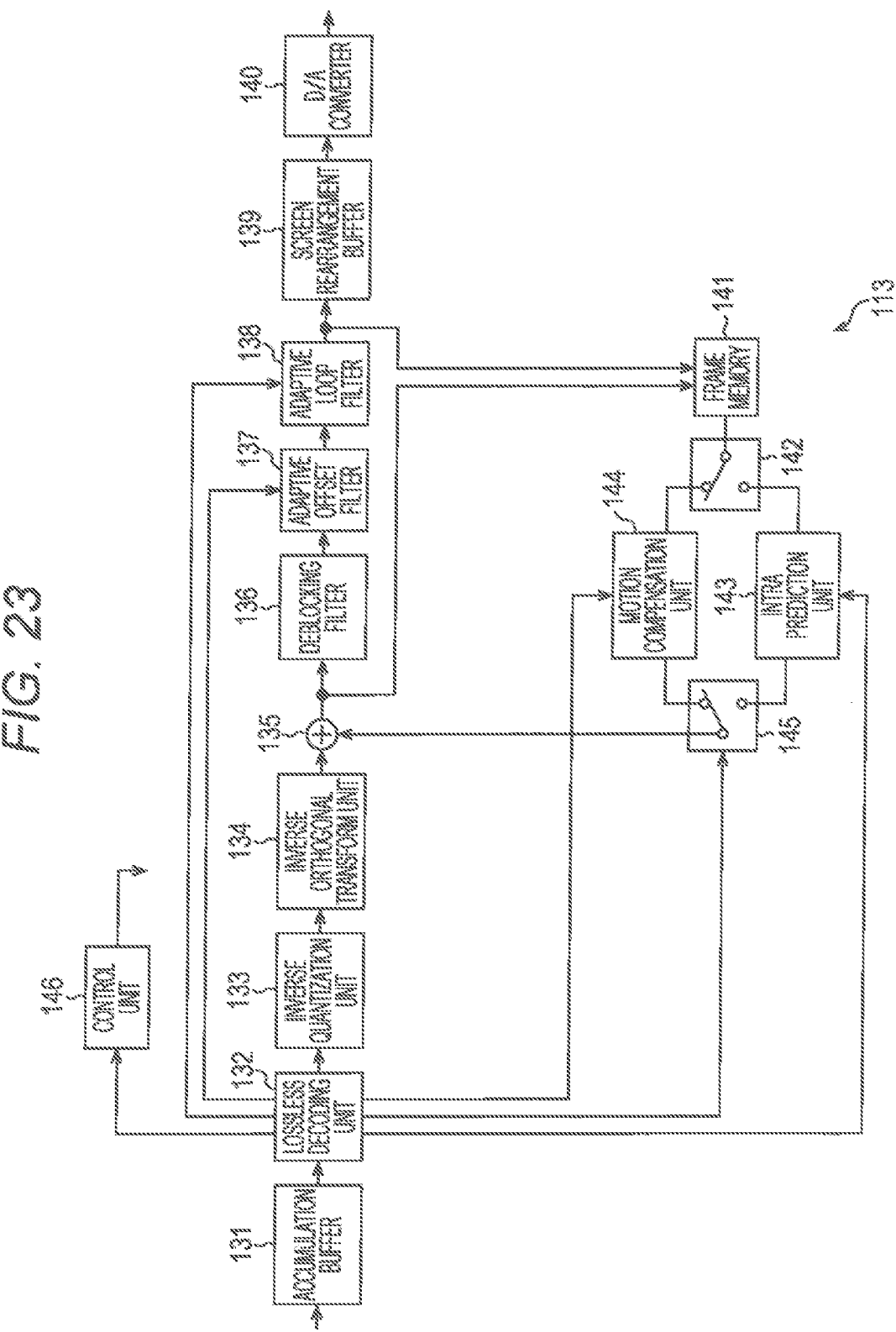
FIG. 23 is a block diagram showing a typical example structure of a decoding unit.

FIG. 23 is a block diagram showing an example structure of the decoding unit 113 shown in FIG. 22.

The decoding unit 113 shown in FIG. 23 includes an accumulation buffer 131, a lossless decoding unit 132, an inverse quantization unit 133, an inverse orthogonal transform unit 134, an addition unit 135, a deblocking filter 136, an adaptive offset filter 137, an adaptive loop filter 138, and a screen rearrangement buffer 139. The decoding unit 113 also includes a D/A converter 140, a frame memory 141, a switch 142, an intra prediction unit 143, a motion compensation unit 144, a switch 145, and a control unit 146.

The accumulation buffer 131 of the decoding unit 113 receives and stores encoded data from the parsing unit 112 shown in FIG. 22. The accumulation buffer 131 supplies the stored encoded data and the like to the lossless decoding unit 132.

The lossless decoding unit 132 obtains a quantized orthogonal transform coefficient and encoding information by performing lossless decoding such as variable-length decoding or arithmetic decoding on the encoded data supplied from the accumulation buffer 131. The lossless decoding unit 132 supplies the quantized orthogonal transform coefficient to the inverse quantization unit 133. The lossless decoding unit 132 also supplies intra prediction mode information and the like as encoding information to the intra prediction unit 143. The lossless decoding unit 132 also supplies the motion compensation unit 144 with a motion vector, inter prediction mode information, information for identifying a reference image, and the like.

The lossless decoding unit 132 further supplies the switch 145 with the intra prediction mode information or the inter prediction mode information as encoding information. The lossless decoding unit 132 supplies offset filter information as encoding information to the adaptive offset filter 137. The lossless decoding unit 132 supplies a filter coefficient as encoding information to the adaptive loop filter 138.

The lossless decoding unit 132 also supplies the identification data parsed by the parsing unit 112, to the control unit 146.

The inverse quantization unit 133, the inverse orthogonal transform unit 134, the addition unit 135, the deblocking filter 136, the adaptive offset filter 137, the adaptive loop filter 138, the frame memory 141, the switch 142, the intra prediction unit 143, and the motion compensation unit 144 perform the same processes as the inverse quantization unit 38, the inverse orthogonal transform unit 39, the addition unit 40, the deblocking filter 41, the adaptive offset filter 42, the adaptive loop filter 43, the frame memory 44, the switch 45, the intra prediction unit 46, and the motion prediction/compensation unit 47 shown in FIG. 18, so as to decode an image.

Specifically, the inverse quantization unit 133 inversely quantizes the quantized orthogonal transform coefficient supplied from the lossless decoding unit 132, and supplies the resultant orthogonal transform coefficient to the inverse orthogonal transform unit 134.

The inverse orthogonal transform unit 134 performs inverse orthogonal transform on the orthogonal transform coefficient supplied from the inverse quantization unit 133, in compliance with HEVC. The inverse orthogonal transform unit 134 supplies the residual error information obtained as a result of the inverse orthogonal transform to the addition unit 135.

The addition unit 135 performs decoding by adding the residual error information supplied from the inverse orthogonal transform unit 134 to a predicted image supplied from the switch 145. The addition unit 135 supplies the decoded image to the deblocking filter 136 and the frame memory 141.

The deblocking filter 136 performs an adaptive deblocking filtering process on the image supplied from the addition unit 135, and supplies the resultant image to the adaptive offset filter 137.

Using the offset indicated by the offset filter information supplied from the lossless decoding unit 132, the adaptive offset filter 137 also performs, for each LCU, an adaptive offset filtering process of the type indicated by the offset filter information, on the image subjected to the adaptive deblocking filtering process. The adaptive offset filter 137 supplies the adaptive loop filter 138 with the image subjected to the adaptive offset filtering process.

Using the filter coefficient supplied from the lossless decoding unit 132, the adaptive loop filter 138 performs, for each LCU, an adaptive loop filtering process on the image supplied from the adaptive offset filter 137. The adaptive loop filter 138 supplies the resultant image to the frame memory 141 and the screen rearrangement buffer 139.

The screen rearrangement buffer 139 stores the image supplied from the adaptive loop filter 138 frame by frame. The screen rearrangement buffer 139 rearranges the frames of the stored image in the original displaying order, instead of the encoding order, and supplies the rearranged image to the D/A converter 140.

The D/A converter 140 performs D/A conversion on the frame-based image supplied from the screen rearrangement buffer 139, and outputs the image.

The frame memory 141 stores the image supplied from the adaptive loop filter 138 and the image supplied from the addition unit 135. An image adjacent to a PU among the images that are stored in the frame memory 141 and have not been subjected to any filtering process is supplied as a peripheral image to the intra prediction unit 143 via the switch 142. Meanwhile, an image that is stored in the frame memory 141 and has been subjected to a filtering process is output as a reference image to the motion compensation unit 144 via the switch 142.

Using the peripheral image that has been read from the frame memory 141 via the switch 142, the intra prediction unit 143 performs an intra prediction process in the optimum intra prediction mode indicated by the intra prediction mode information supplied from the lossless decoding unit 132. The intra prediction unit 143 supplies the resultant predicted image to the switch 145.

From the frame memory 141 via the switch 142, the motion compensation unit 144 reads the reference image identified by the information supplied from the lossless decoding unit 132 for identifying the reference image. Using the motion vector and the reference image supplied from the lossless decoding unit 132, the motion compensation unit 144 performs a motion compensation process in the optimum inter prediction mode indicated by the inter prediction mode information supplied from the lossless decoding unit 132. The motion compensation unit 144 supplies the resultant predicted image to the switch 145.

When the intra prediction mode information is supplied from the lossless decoding unit 132, the switch 145 supplies the predicted image supplied from the intra prediction unit 143 to the addition unit 135. When the inter prediction mode information is supplied from the lossless decoding unit 132, on the other hand, the switch 145 supplies the predicted image supplied from the motion compensation unit 144 to the addition unit 135.

The control unit 146 obtains, via the lossless decoding unit 132, identification data (profile_tier_level( ), for example) supplied from the setting unit 11 for identifying an extended profile. The control unit 146 appropriately controls the respective components of the decoding unit 113 based on the identification data. That is, the control unit 146 supplies the respective components with the parameter indicating the setting state of the coding tool required for specifying the extended profile indicated by the identification data, to control operations of the respective components so that decoding is performed in accordance with the extended profile. Although not explained in the above description, the respective components of the decoding unit 113 operate under the control of the control unit 146.

As described above, the decoding device 110 parses identification data for identifying an extended profile that is an extension of a profile specified in a coding standard from an encoded stream that has been encoded in compliance with the coding standard for performing encoding on each unit having recursive hierarchical structures, and decodes the encoded stream by referring to the parsed identification data. Accordingly, a wider variety of images can be more readily decoded.

<Flow in an Image Generation Process>

Next, the flow in each process to be performed by the above described decoding device 110 is described. Referring first to the flowchart shown in FIG. 24, an example flow in an image generation process is described.

Figure 24:
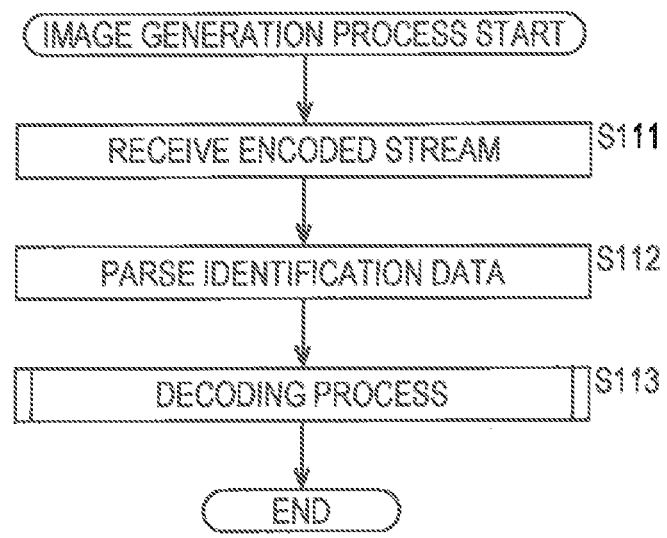
FIG. 24 is a flowchart for explaining an image generation process.

When the image generation process is started, the reception unit 111 of the decoding device 110 in step S111 in FIG. 24 receives an encoded stream transmitted from the encoding device 10, and supplies the encoded stream to the parsing unit 112.

In step S112, from the encoded stream supplied from the reception unit 111, the parsing unit 112 parses the identification data for identifying an extended profile that is an extension of a profile specified in the coding standard. The parsing unit 112 also extracts various kinds of parameter sets and encoded data from the encoded stream.

In step S113, the decoding unit 113 refers to the parameter sets and the identification data supplied from the parsing unit 112 as necessary, and performs a decoding process to decode the encoded data supplied from the parsing unit 112 by a method compliant with HEVC. This decoding process will be described later in detail with reference to FIG. 25. The process then comes to an end.

<Flow in the Decoding Process>

Figure 25:
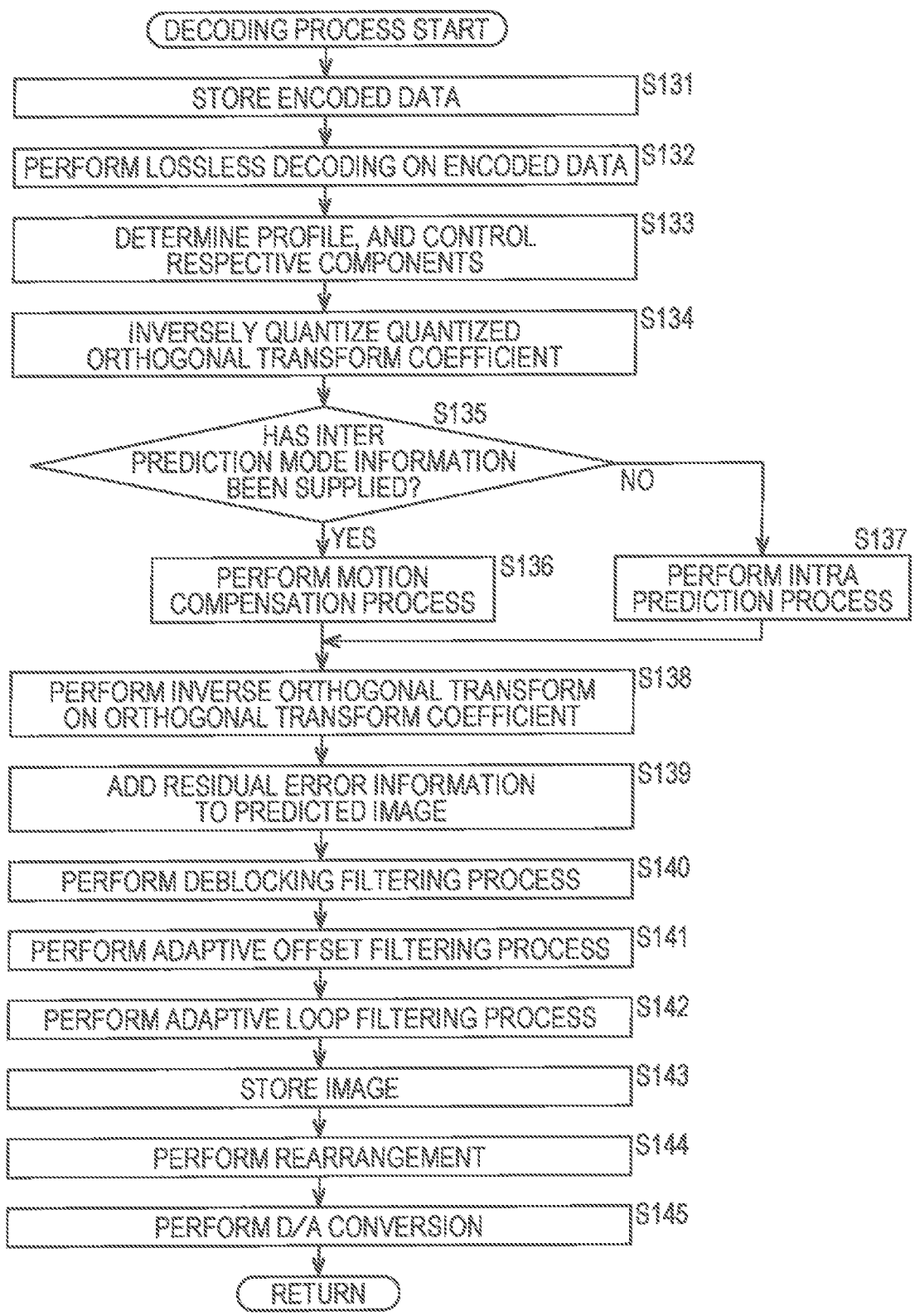
FIG. 25 is a flowchart for explaining a decoding process in detail.

FIG. 25 is a flowchart for specifically explaining the decoding process in step S113 in FIG. 24.

In step S131 in FIG. 25, the accumulation buffer 131 of the decoding unit 113 receives and stores frame-based encoded data and the like from the parsing unit 112. The accumulation buffer 131 supplies the stored encoded data and the like to the lossless decoding unit 132.

In step S132, the lossless decoding unit 132 performs lossless decoding on the encoded data and the like supplied from the accumulation buffer 131, to obtain a quantized orthogonal transform coefficient and encoding information. The lossless decoding unit 132 supplies the quantized orthogonal transform coefficient to the inverse quantization unit 133. The lossless decoding unit 132 also supplies the identification data parsed by the parsing unit 112, to the control unit 146.

The lossless decoding unit 132 also supplies intra prediction mode information and the like as encoding information to the intra prediction unit 143. The lossless decoding unit 132 also supplies the motion compensation unit 144 with a motion vector, inter prediction mode information, information for identifying a reference image, and the like.

The lossless decoding unit 132 further supplies the switch 145 with the intra prediction mode information or the inter prediction mode information as encoding information. The lossless decoding unit 132 supplies offset filter information as encoding information to the adaptive offset filter 137, and supplies a filter coefficient to the adaptive loop filter 138.

In step S133, the control unit 146 obtains, via the lossless decoding unit 132, identification data (profile_tier_level( ), for example) supplied from the setting unit 11 for identifying an extended profile. The control unit 146 supplies the respective components with the parameter indicating the setting state of the coding tool required for specifying the extended profile indicated by the identification data, to control operations of the respective components so that decoding is performed in accordance with the extended profile.

In step S134, the inverse quantization unit 133 inversely quantizes the quantized orthogonal transform coefficient supplied from the lossless decoding unit 132, and supplies the resultant orthogonal transform coefficient to the inverse orthogonal transform unit 134.

In step S135, the motion compensation unit 144 determines whether the inter prediction mode information has been supplied from the lossless decoding unit 132. If it is determined in step S135 that the inter prediction mode information has been supplied, the process moves on to step S136.

In step S136, the motion compensation unit 144 reads the reference image based on the reference-image identification information supplied from the lossless decoding unit 132, and performs a motion compensation process in the optimum inter prediction mode indicated by the inter prediction mode information, using the motion vector and the reference image. The motion compensation unit 144 supplies the resultant predicted image to the addition unit 135 via the switch 145, and the process then moves on to step S138.

If it is determined in step S135 that the inter prediction mode information has not been supplied, or that the intra prediction mode information has been supplied to the intra prediction unit 143, the process moves on to step S137.

In step S137, using the peripheral image that has been read from the frame memory 141 via the switch 142, the intra prediction unit 143 performs an intra prediction process in the optimum intra prediction mode indicated by the intra prediction mode information. The intra prediction unit 143 supplies the predicted image generated as a result of the intra prediction process to the addition unit 135 via the switch 145, and the process then moves on to step S138.

In step S138, the inverse orthogonal transform unit 134 performs inverse orthogonal transform on the orthogonal transform coefficient. The inverse orthogonal transform unit 134 supplies the resultant residual error information to the addition unit 135.

In step S139, the addition unit 135 performs decoding by adding the residual error information supplied from the inverse orthogonal transform unit 134 to a predicted image supplied from the switch 145. The addition unit 135 supplies the decoded image to the deblocking filter 136 and the frame memory 141.

In step S140, the deblocking filter 136 performs a deblocking filtering process on the image supplied from the addition unit 135, to remove block distortion. The deblocking filter 136 supplies the resultant image to the adaptive offset filter 137.

In step S141, based on the offset filter information supplied from the lossless decoding unit 132, the adaptive offset filter 137 performs, for each LCU, an adaptive offset filtering process on the image subjected to the deblocking filtering process by the deblocking filter 136. The adaptive offset filter 137 supplies the adaptive loop filter 138 with the image subjected to the adaptive offset filtering process.

In step S142, using the filter coefficient supplied from the lossless decoding unit 132, the adaptive loop filter 138 performs, for each LCU, an adaptive loop filtering process on the image supplied from the adaptive offset filter 137. The adaptive loop filter 138 supplies the resultant image to the frame memory 141 and the screen rearrangement buffer 139.

In step S143, the frame memory 141 stores the image supplied from the addition unit 135 and the image supplied from the adaptive loop filter 138. An image adjacent to a PU among the images that are stored in the frame memory 141 and have not been subjected to any filtering process is supplied as a peripheral image to the intra prediction unit 143 via the switch 142. Meanwhile, an image that is stored in the frame memory 141 and has been subjected to a filtering process is output as a reference image to the motion compensation unit 144 via the switch 142.

In step S144, the screen rearrangement buffer 139 stores the image supplied from the adaptive loop filter 138 frame by frame, rearranges the frames of the stored image in the original displaying order, instead of the encoding order, and supplies the rearranged image to the D/A converter 140.

In step S145, the D/A converter 140 performs D/A conversion on the frame-based image supplied from the screen rearrangement buffer 139, and outputs the image. The process then returns to step S113 in FIG. 24, and comes to an end.

By performing the respective processes in the above manner, the decoding device 110 can more readily decode a wider variety of images.

The advantageous effects described in this specification are merely examples, and the advantageous effects of the present technology are not limited to them and may include other effects.

It should be noted that embodiments of the present disclosure are not limited to the above described embodiment, and various modifications may be made to the above embodiments without departing from the scope of the present disclosure.

For example, the size of a TU at a time when the method of orthogonal transform (or inverse orthogonal transform) is determined in accordance with the distance between the TU and a peripheral image is not limited to 4×4 pixels.

The present disclosure can also be applied to encoding devices and decoding devices using encoding methods (such as MPEG and H.26x) other than the HEVC method by which a PU at a time of intra prediction is divided into square TUs before orthogonal transform is performed.

4. Fourth Embodiment

<Computer>

The above described series of processes can be performed by hardware or can be performed by software. When the series of processes are to be conducted by software, the program that forms the software is installed into a computer.

Here, the computer may be a computer incorporated into special-purpose hardware, or may be a general-purpose personal computer that can execute various kinds of functions as various kinds of programs are installed thereinto, for example.

Figure 26:
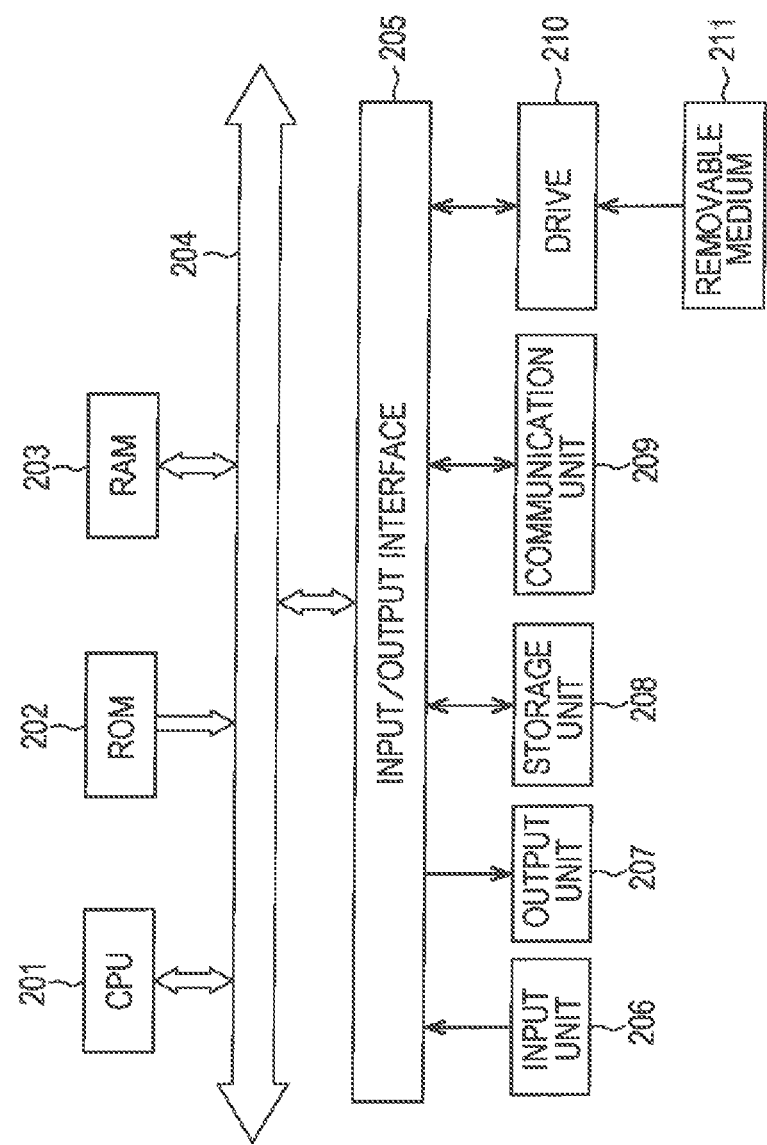
FIG. 26 is a block diagram showing a typical example structure of a computer.

FIG. 26 is a block diagram showing an example configuration of the hardware of a computer that performs the above described series of processes in accordance with a program.

In the computer shown in FIG. 26, a central processing unit (CPU) 201, a read only memory (ROM) 202, and a random access memory (RAM) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 is formed with a keyboard, a mouse, a microphone, and the like. The output unit 207 is formed with a display, a speaker, and the like. The storage unit 208 is formed with a hard disk, a nonvolatile memory, or the like. The communication unit 209 is formed with a network interface or the like. The drive 210 drives a removable medium 211 such as a magnetic disk, an optical disk, a magnetooptical disk, or a semiconductor memory.

In the computer having the above described structure, the CPU 201 loads a program stored in the storage unit 208 into the RAM 203 via the input/output interface 205 and the bus 204, for example, and executes the program, so that the above described series of processes are performed.

The program to be executed by the computer (the CPU 201) may be recorded on the removable medium 211 as a packaged medium to be provided, for example. Alternatively, the program can be provided via a wired or wireless transmission medium such as a local area network, the Internet, or digital satellite broadcasting.

In the computer, the program can be installed into the storage unit 208 via the input/output interface 205 when the removable medium 211 is mounted on the drive 210. The program can also be received by the communication unit 209 via a wired or wireless transmission medium, and be installed into the storage unit 208. Also, the program may be installed beforehand into the ROM 202 or the storage unit 208.

The program to be executed by the computer may be a program for performing processes in chronological order in accordance with the sequence described in this specification, or may be a program for performing processes in parallel or performing a process when necessary, such as when there is a call.

In this specification, steps describing the program to be recorded in a recording medium include processes to be performed in parallel or independently of one another if not necessarily in chronological order, as well as processes to be performed in chronological order in accordance with the sequence described herein.

In this specification, a system means an assembly of components (devices, modules (parts), and the like), and not all the components need to be provided in the same housing. In view of this, devices that are housed in different housings and are connected to each other via a network form a system, and one device having modules housed in one housing is also a system.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the functions of the system as a whole are substantially the same.

While preferred embodiments of the present disclosure have been described above with reference to the accompanying drawings, the technical scope of the present disclosure is not limited to those examples. It is apparent that those who have ordinary skills in the technical field of the present disclosure can make various changes or modifications within the scope of the technical spirit claimed herein, and it should be understood that those changes or modifications are within the technical scope of the present disclosure.

For example, the present technology can be embodied in a cloud computing structure in which one function is shared among devices via a network, and processing is performed by the devices cooperating with one another.

The respective steps described with reference to the above described flowcharts can be carried out by one device or can be shared among devices.

In a case where more than one process is included in one step, the processes included in the step can be performed by one device or can be shared among devices.

The scope of application of the present technology can be applied to any image processing devices (such as encoding devices and decoding devices) that are capable of encoding and decoding partial images.

The present technology can also be applied to image processing devices (such as encoding devices and decoding devices) that are used for receiving image information (bit streams) compressed through orthogonal transform such as discrete cosine transform and motion compensation, like MPEG, H.26x, and the like, via a network medium such as satellite broadcasting, cable television broadcasting, the Internet, or a portable telephone apparatus. The present technology can also be applied to image processing devices (such as encoding devices and decoding devices) that are used when processing is performed on a storage medium such as an optical or magnetic disk or a flash memory.

The encoding device and the decoding device according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as optical disks, magnetic disks, and flash memory, and reproduction devices configured to reproduce images from the storage media. Four examples of applications will be described below.

5. Fifth Embodiment

First Example Application: Television Receiver

Figure 27:
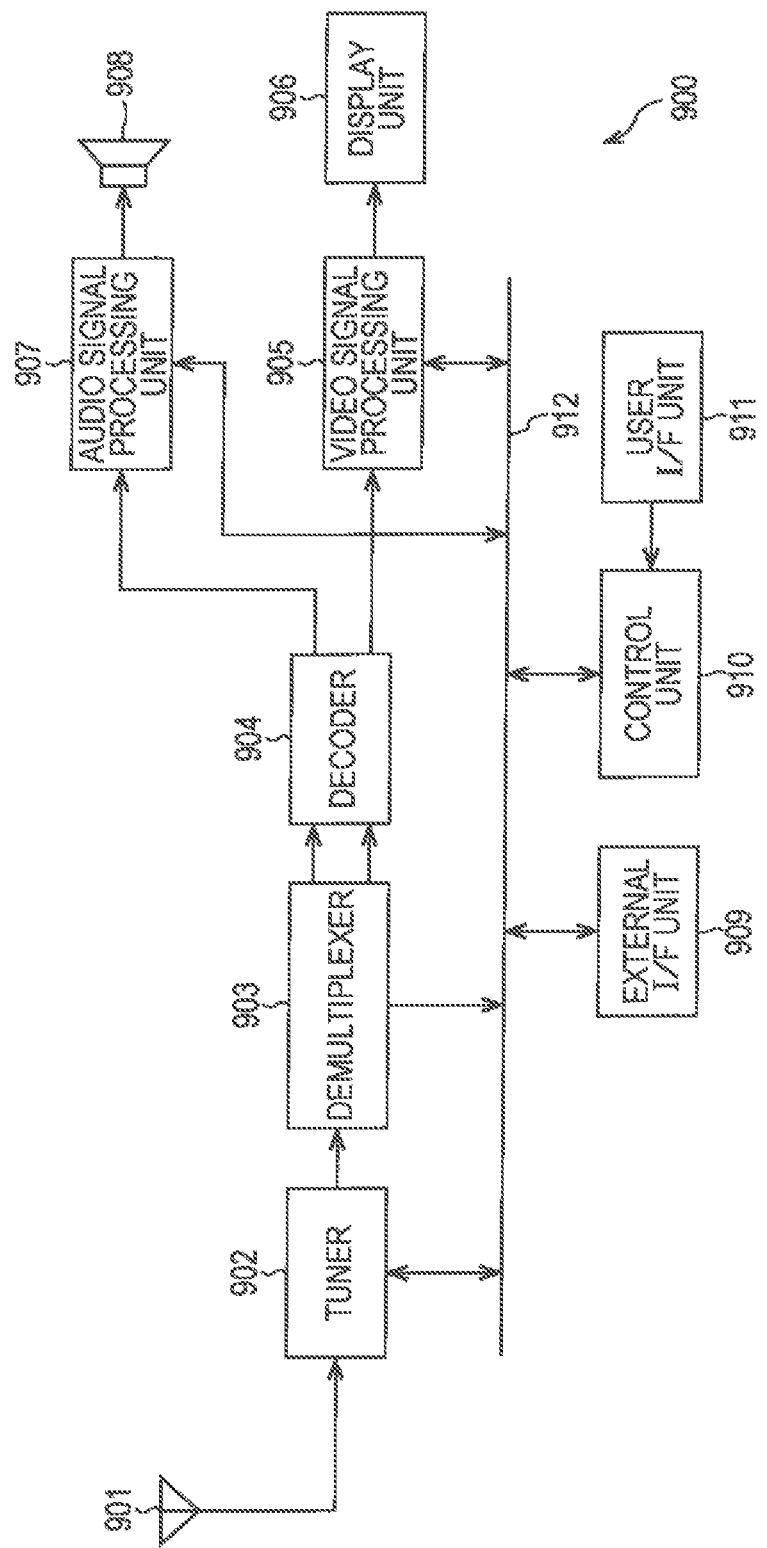
FIG. 27 is a block diagram schematically showing an example structure of a television apparatus.

FIG. 27 schematically shows an example structure of a television apparatus to which the above described embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as a transmission unit in the television apparatus 900 that receives an encoded stream of encoded images.

The demultiplexer 903 separates a video stream and an audio stream of a program to be viewed from the encoded bit stream, and outputs the separated streams to the decoder 904. The demultiplexer 903 also extracts auxiliary data such as an electronic program guide (EPG) from the encoded bit stream, and supplies the extracted data to the control unit 910. If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processing unit 905. The decoder 904 also outputs audio data generated by the decoding to the audio signal processing unit 907.

The video signal processing unit 905 reproduces video data input from the decoder 904, and displays the video data on the display unit 906. The video signal processing unit 905 may also display an application screen supplied via the network on the display unit 906. Furthermore, the video signal processing unit 905 may perform additional processing such as noise removal on the video data depending on settings. The video signal processing unit 905 may further generate an image of a graphical user interface (GUI) such as a menu, a button, or a cursor, and superimpose the generated image on the output image.

The display unit 906 is driven by a drive signal supplied from the video signal processing unit 905, and displays video or images on a video screen of a display device (such as a liquid crystal display, a plasma display, or an organic electroluminescence display (OELD).

The audio signal processing unit 907 performs reproduction processing such as D/A conversion and amplification on the audio data input from the decoder 904, and outputs audio through the speaker 908. Furthermore, the audio signal processing unit 907 may perform additional processing such as noise removal on the audio data.

The external interface unit 909 is an interface for connecting the television apparatus 900 to an external device or a network. For example, a video stream or an audio stream received via the external interface unit 909 may be decoded by the decoder 904. That is, the external interface unit 909 also serves as a transmission unit in the television apparatus 900 that receives an encoded stream of encoded images.

The control unit 910 includes a processor such as a CPU, and a memory such as a RAM or a ROM. The memory stores the program to be executed by the CPU, program data, EPG data, data acquired via the network, and the like. The program stored in the memory is read and executed by the CPU when the television apparatus 900 is activated, for example. The CPU controls the operation of the television apparatus 900 according to an operating signal input from the user interface unit 911, for example, by executing the program.

The user interface unit 911 is connected to the control unit 910. The user interface unit 911 includes buttons and switches for users to operate the television apparatus 900 and a receiving unit for receiving remote control signals, for example. The user interface unit 911 detects a user operation via these components, generates an operating signal, and outputs the generated operating signal to the control unit 910.

The bus 912 connects the tuner 902, the demultiplexer 903, the decoder 904, the video signal processing unit 905, the audio signal processing unit 907, the external interface unit 909, and the control unit 910 to one another.

In the television apparatus 900 having such a structure, the decoder 904 has the functions of the decoding device 110 according to the embodiments described above. Accordingly, the television apparatus 900 can more readily encode and decode a wider variety of images.

Second Example Application: Portable Telephone Apparatus

Figure 28:
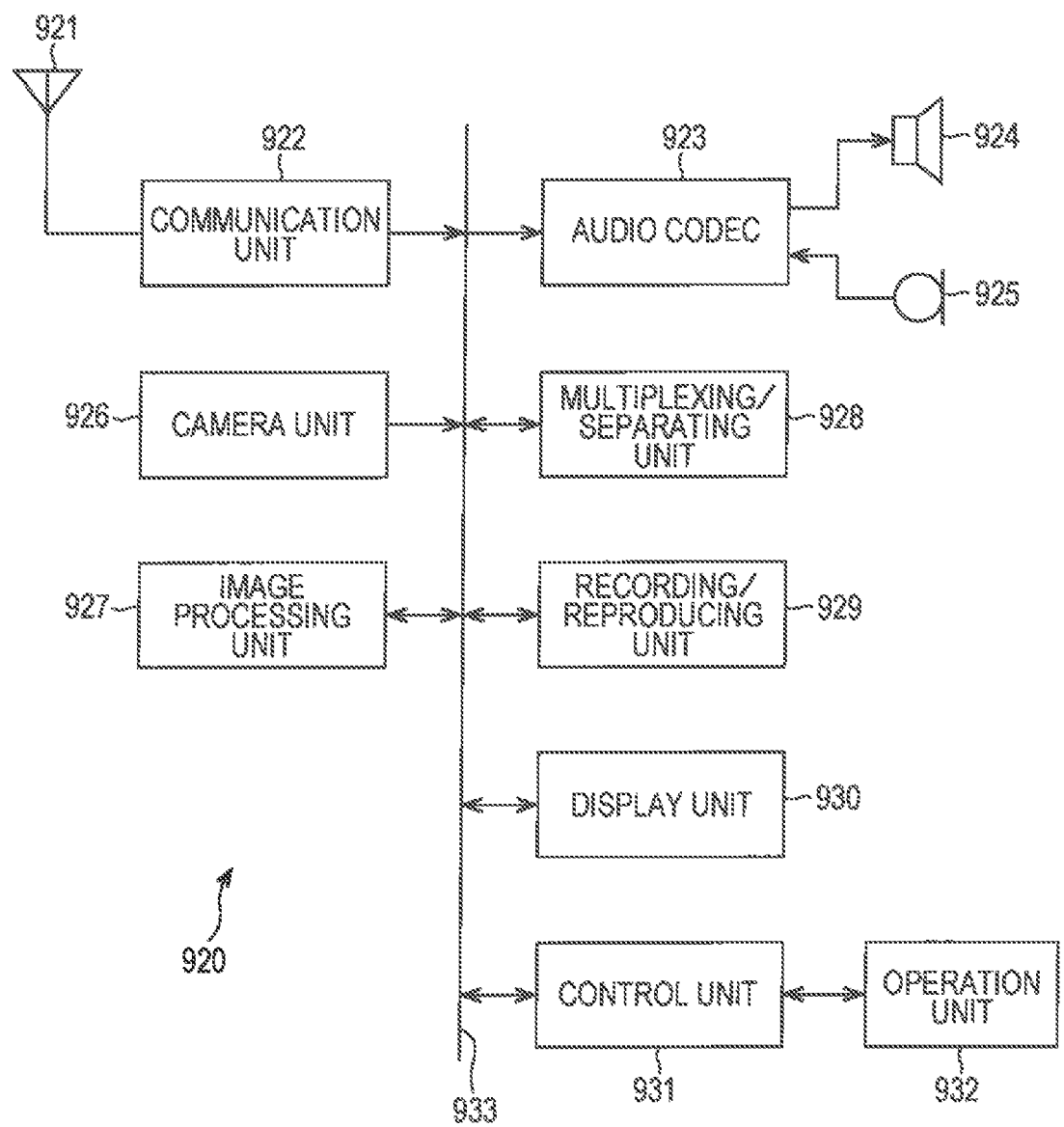
FIG. 28 is a block diagram schematically showing an example structure of a portable telephone apparatus.

FIG. 28 schematically shows an example structure of a portable telephone apparatus to which the above described embodiments are applied. The portable telephone apparatus 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to one another.

The portable telephone apparatus 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the compressed audio data to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also performs amplification and a frequency conversion on a radio signal received via the antenna 921, and obtains a received signal. The communication unit 922 then demodulates and decodes the received signal to generate audio data, and outputs the generated audio data to the audio codec 923. The audio codec 923 performs decompression and D/A conversion on the audio data, to generate an analog audio signal. The audio codec 923 then supplies the generated audio signal to the speaker 924 to output audio therefrom.

In the data communication mode, the control unit 931 generates text data constituting an electronic mail in accordance with an operation by the user via the operation unit 932. The control unit 931 also displays the text on the display unit 930. The control unit 931 also generates electronic mail data in response to an instruction for transmission from a user via the operation unit 932, and outputs the generated electronic mail data to the communication unit 922. The communication unit 922 encodes and modulates the electronic mail data, to generate a transmission signal. The communication unit 922 then transmits the generated signal to be transmitted to a base station (not shown) via the antenna 921. The communication unit 922 also performs amplification and a frequency conversion on a radio signal received via the antenna 921, and obtains a received signal. The communication unit 922 then demodulates and decodes the received signal to restore electronic mail data, and outputs the restored electronic mail data to the control unit 931. The control unit 931 displays the content of the electronic mail on the display unit 930, and supplies the electronic mail data to the recording/reproducing unit 929 to write the data into the storage medium thereof.

The recording/reproducing unit 929 includes a readable/writable storage medium. For example, the storage medium may be an internal storage medium such as a RAM or flash memory, or may be an externally mounted storage medium such as a hard disk, a magnetic disk, a magnetooptical disk, an optical disk, a Universal Serial Bus (USB) memory, or a memory card.

In the imaging mode, the camera unit 926 generates image data by capturing an image of an object, and outputs the generated image data to the image processing unit 927. The image processing unit 927 encodes the image data input from the camera unit 926, and supplies the encoded stream to the recording/reproducing unit 929 to write the encoded stream into the storage medium thereof.

Further, in an image display mode, the recording/reproducing unit 929 reads the encoded stream recorded in the storage medium, and outputs the encoded stream to the image processing unit 927. The image processing unit 927 decodes the encoded stream input from the recording/reproducing unit 929, and supplies the image data to the display unit 930 to display the image.

In the video telephone mode, the multiplexing/separating unit 928 multiplexes a video stream encoded by the image processing unit 927 and an audio stream input from the audio codec 923, and outputs the multiplexed stream to the communication unit 922. The communication unit 922 encodes and modulates the stream to generate a signal to be transmitted. The communication unit 922 then transmits the generated signal to be transmitted to a base station (not shown) via the antenna 921. The communication unit 922 also performs amplification and a frequency conversion on a radio signal received via the antenna 921, and obtains a received signal. The transmission signal and the reception signal each include an encoded bit stream. The communication unit 922 restores a stream by demodulating and decoding the reception signal, and outputs the restored stream to the multiplexing/separating unit 928. The multiplexing/separating unit 928 separates a video stream and an audio stream from the input stream, and outputs the video stream to the image processing unit 927 and the audio stream to the audio codec 923. The image processing unit 927 decodes the video stream to generate video data. The video data is supplied to the display unit 930, and a series of images is displayed by the display unit 930. The audio codec 923 performs decompression and D/A conversion on the audio stream, to generate an analog audio signal. The audio codec 923 then supplies the generated audio signal to the speaker 924 to output audio therefrom.

In the portable telephone apparatus 920 having the above described structure, the image processing unit 927 has the functions of the encoding device 10 and the decoding device 110 according to the above described embodiments. Accordingly, the portable telephone apparatus 920 can more readily encode and decode a wider variety of images.

Third Example Application: Recording/Reproducing Apparatus

Figure 29:
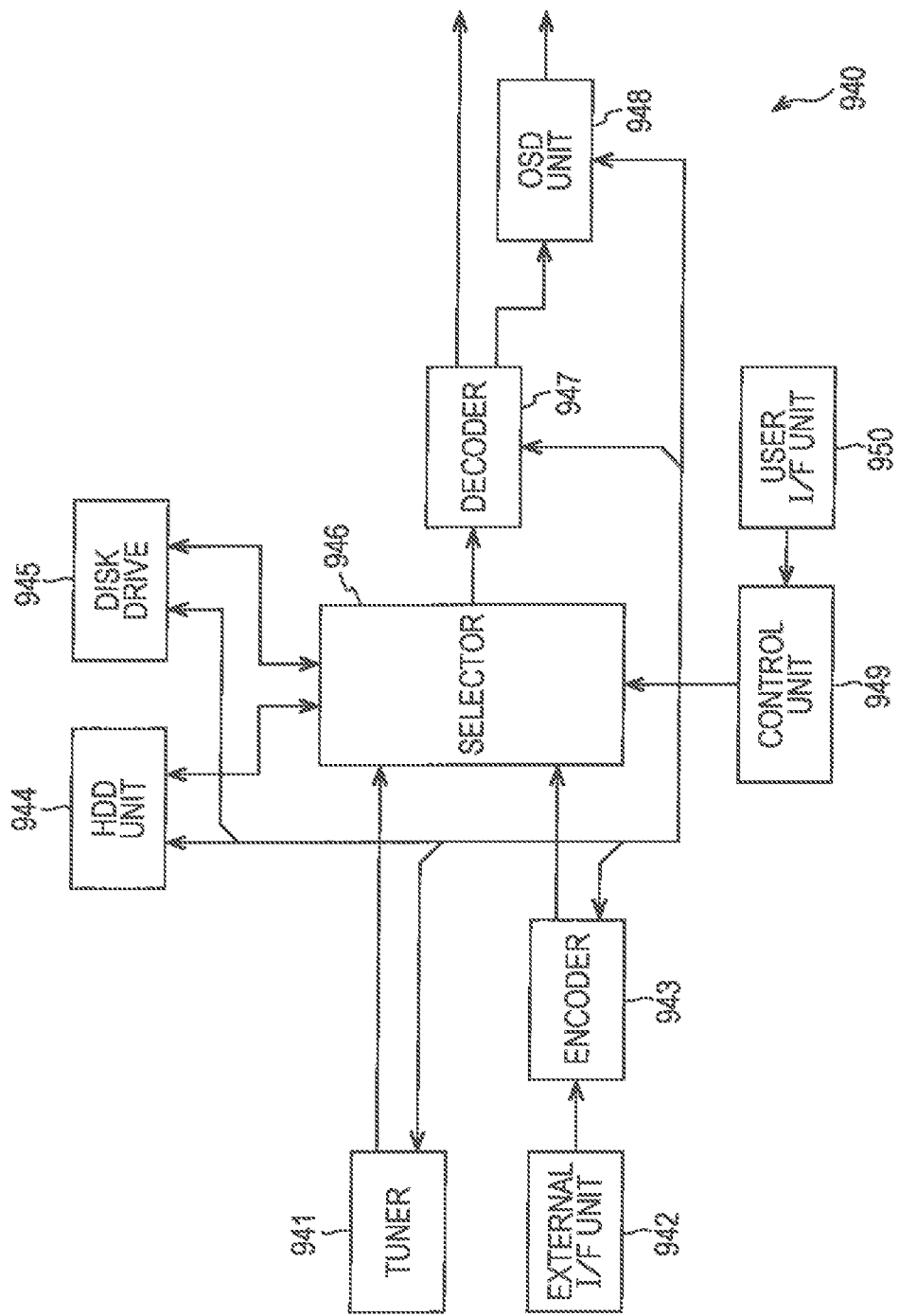
FIG. 29 is a block diagram schematically showing an example structure of a recording/reproducing apparatus.

FIG. 29 schematically shows an example structure of a recording/reproducing apparatus to which the above described embodiments are applied. A recording/reproducing apparatus 940 encodes audio data and video data of a received broadcast show, for example, and records the audio data and the video data on a recording medium. The recording/reproducing apparatus 940 may encode audio data and video data acquired from another apparatus, for example, and record the audio data and the video data on the recording medium. The recording/reproducing apparatus 940 also reproduces data recorded in the recording medium on a monitor and through a speaker in response to an instruction from a user, for example. In this case, the recording/reproducing apparatus 940 decodes audio data and video data.

The recording/reproducing apparatus 940 includes a tuner 941, an external interface (I/F) unit 942, an encoder 943, an Hard Disk Drive (HDD) 944, a disk drive 945, a selector 946, a decoder 947, an On-Screen Display (OSD) 948, a control unit 949, and a user interface (I/F) unit 950.

The tuner 941 extracts a signal of a desired channel from broadcast signals received via an antenna (not shown), and demodulates the extracted signal. The tuner 941 outputs the encoded bit stream obtained by the demodulation to the selector 946. That is, the tuner 941 serves as a transmission unit in the recording/reproducing apparatus 940.

The external interface unit 942 is an interface for connecting the recording/reproducing apparatus 940 to an external device or a network. The external interface unit 942 may be an Institute of Electrical and Electronic Engineers (IEEE) 1394 interface, a network interface, a USB interface, or a flash memory interface, for example. Video data and audio data received via the external interface unit 942 are input to the encoder 943, for example. That is, the external interface unit 942 has a role as a transmission unit in the recording/reproducing apparatus 940.

The encoder 943 encodes the video data and the audio data if the video data and the audio data input from the external interface unit 942 are not encoded. The encoder 943 then outputs an encoded bit stream to the selector 946.

The HDD 944 records an encoded bit stream of compressed content data such as a video image and sound, various programs, and other data in an internal hard disk. The HDD 944 also reads the data from the hard disk for reproduction of the video image and the sound.

The disk drive 945 records and reads data into/from a recording medium mounted thereon. The recording medium mounted on the disk drive 945 may be a Digital Versatile Disc (DVD) (such as DVD-Video, DVD-Random Access Memory (DVD-RAM), DVD-Recordable (DVD-R), DVD-Rewritable (DVD-RW), DVD+Recordable (DVD+R), or DVD+Rewritable (DVD+RW)), or a Blu-ray (a registered trade name) disk, for example.

At a time of recording of a video image and sound, the selector 946 selects an encoded bit stream input from the tuner 941 or the encoder 943 and outputs the selected encoded bit stream to the HDD 944 or the disk drive 945. At a time of reproduction of a video image and audio, the selector 946 outputs an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 947 also outputs the generated audio data to an external speaker.

The OSD 948 reproduces the video data input from the decoder 947 and displays the video image. The OSD 948 may also superimpose a GUI image such as a menu, a button, or a cursor on the video image to be displayed.

The control unit 949 includes a processor such as a CPU, and a memory such as a RAM and a ROM. The memory stores the program to be executed by the CPU, program data, and the like. The program stored in the memory is read and executed by the CPU when the recording/reproducing apparatus 940 is activated, for example. By executing the program, the CPU controls operation of the recording/reproducing apparatus 940 in accordance with an operating signal input from the user interface unit 950, for example.

The user interface unit 950 is connected to the control unit 949. The user interface unit 950 includes buttons and switches for users to operate the recording/reproducing apparatus 940 and a receiving unit for receiving remote control signals, for example. The user interface unit 950 detects operation performed by a user via these components, generates an operating signal, and outputs the generated operating signal to the control unit 949.

In the recording/reproducing apparatus 940 having such a structure, the encoder 943 has the functions of the encoding device 10 according to the embodiments described above. Also, the decoder 947 has the functions of the decoding device 110 according to the above described embodiments. Accordingly, the recording/reproducing apparatus 940 can more readily decode a wider variety of images.

Fourth Example Application: Imaging Apparatus

Figure 30:
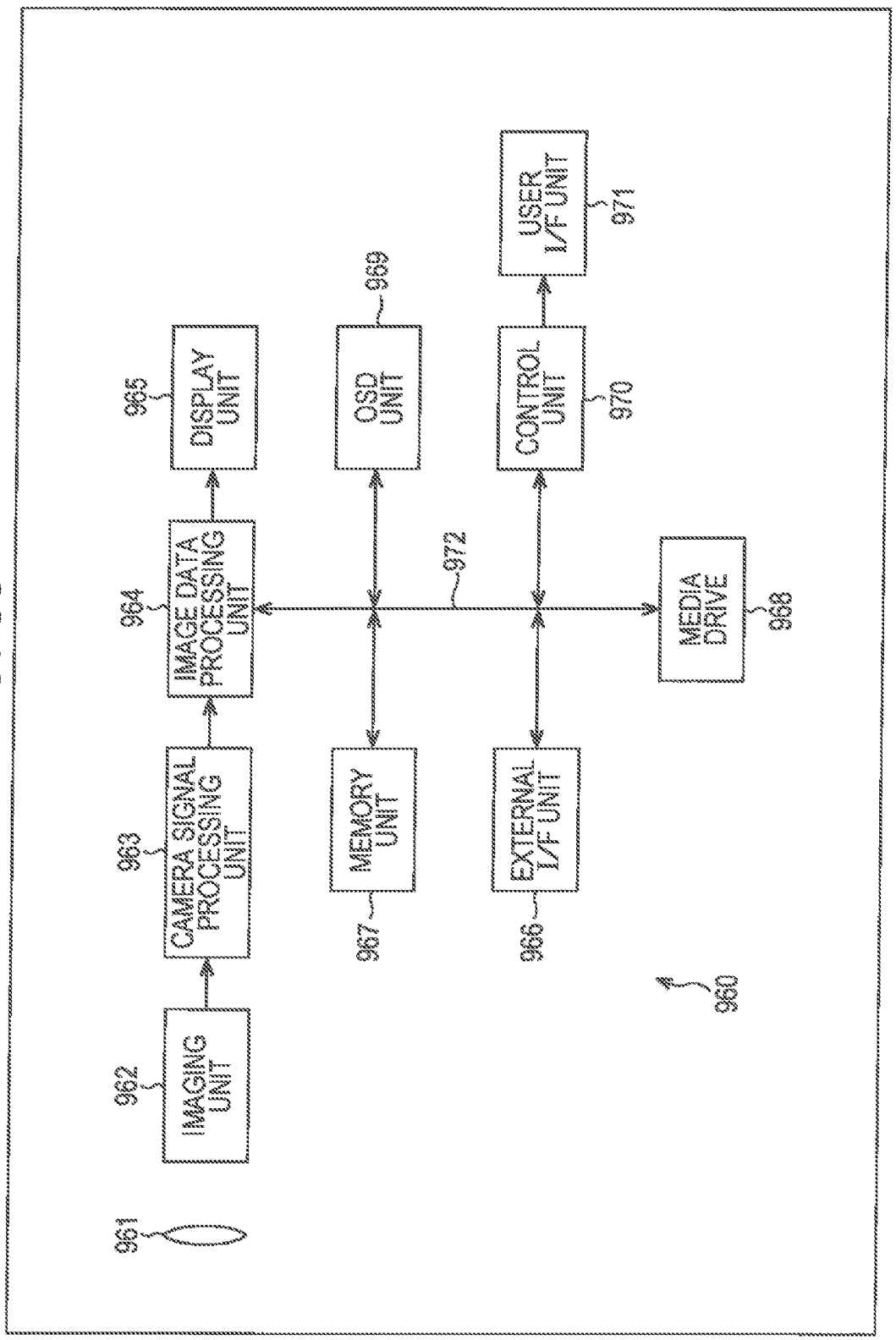
FIG. 30 is a block diagram schematically showing an example structure of an imaging apparatus.

FIG. 30 schematically shows an example structure of an imaging apparatus to which the above described embodiments are applied. An imaging apparatus 960 generates an image by imaging an object, encodes the image data, and records the image data on a recording medium.

The imaging apparatus 960 includes an optical block 961, an imaging unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the media drive 968, the OSD 969, and the control unit 970 to one another.

The optical block 961 includes a focus lens and a diaphragm. The optical block 961 forms an optical image of an object on the imaging surface of the imaging unit 962. The imaging unit 962 includes an image sensor such as a Charge Coupled Device (CCD) or a Complementary Metal Oxide Semiconductor (CMOS), and converts the optical image formed on the imaging surface into an image signal as an electrical signal by photoelectric conversion. The imaging unit 962 outputs the image signal to the signal processing unit 963.

The signal processing unit 963 performs various kinds of camera signal processing such as knee correction, gamma correction, and color correction on the image signal input from the imaging unit 962. The signal processing unit 963 outputs the image data subjected to the camera signal processing to the image processing unit 964.

The image processing unit 964 encodes the image data input from the signal processing unit 963, to generate encoded data. The image processing unit 964 then outputs the generated encoded data to the external interface unit 966 or the media drive 968. The image processing unit 964 also decodes encoded data input from the external interface unit 966 or the media drive 968, to generate image data. The image processing unit 964 outputs the generated image data to the display unit 965. The image processing unit 964 may output image data input from the signal processing unit 963 to the display unit 965 to display images. The image processing unit 964 may also superimpose data for display acquired from the OSD 969 on the image to be output to the display unit 965.

The OSD 969 may generate a GUI image such as a menu, a button, or a cursor, and output the generated image to the image processing unit 964.

The external interface unit 966 is formed as a USB input/output terminal, for example. The external interface unit 966 connects the imaging apparatus 960 to a printer at the time of printing of an image, for example. A drive is also connected to the external interface unit 966, if necessary. A removable medium such as a magnetic disk or an optical disk is mounted on the drive so that a program read from the removable medium can be installed into the imaging apparatus 960. Furthermore, the external interface unit 966 may be a network interface connected to a network such as a LAN or the Internet. That is, the external interface unit 966 has a role as a transmission mean in the imaging apparatus 960.

The recording medium to be mounted on the media drive 968 may be a readable/writable removable medium such as a magnetic disk, a magnetooptical disk, an optical disk, or a semiconductor memory. Alternatively, a recording medium may be mounted on the media drive 968 in a fixed manner to form an immobile storage unit such as an internal hard disk drive or an solid state drive (SSD).

The control unit 970 includes a processor such as a CPU, and a memory such as a RAM and a ROM. The memory stores the program to be executed by the CPU, program data, and the like. The program stored in the memory is read and executed by the CPU when the imaging apparatus 960 is activated, for example. The CPU controls the operation of the imaging apparatus 960 according to an operating signal input from the user interface unit 971, for example, by executing the program.

The user interface unit 971 is connected to the control unit 970. The user interface unit 971 includes buttons and switches for users to operate the imaging apparatus 960, for example. The user interface unit 971 detects operation performed by a user via these components, generates an operating signal, and outputs the generated operating signal to the control unit 970.

In the imaging apparatus 960 having the above described structure, the image processing unit 964 has the functions of the encoding device 10 and the decoding device 110 according to the above described embodiments. Accordingly, the imaging apparatus 960 can more readily encode and decode a wider variety of images.

The present technology can also be applied to HTTP streaming, such as MPEG DASH, which uses appropriate encoded data selected on a segment basis from among predetermined pieces of encoded data having different resolutions from one another. That is, information related to encoding and decoding can be shared among such pieces of encoded data.

6. Sixth Embodiment

Other Examples of Embodiments

Although examples of devices, systems, and the like to which the present technology is applied have been described above, the present technology is not limited to them, and can be embodied as any structure to be mounted on the above devices or devices in the systems, such as a processor as a system Large Scale Integration (LSI) or the like, a module using processors or the like, a unit using modules or the like, and a set (or a structure in a device) having other functions added to the unit.

<Video Set>

Figure 31:
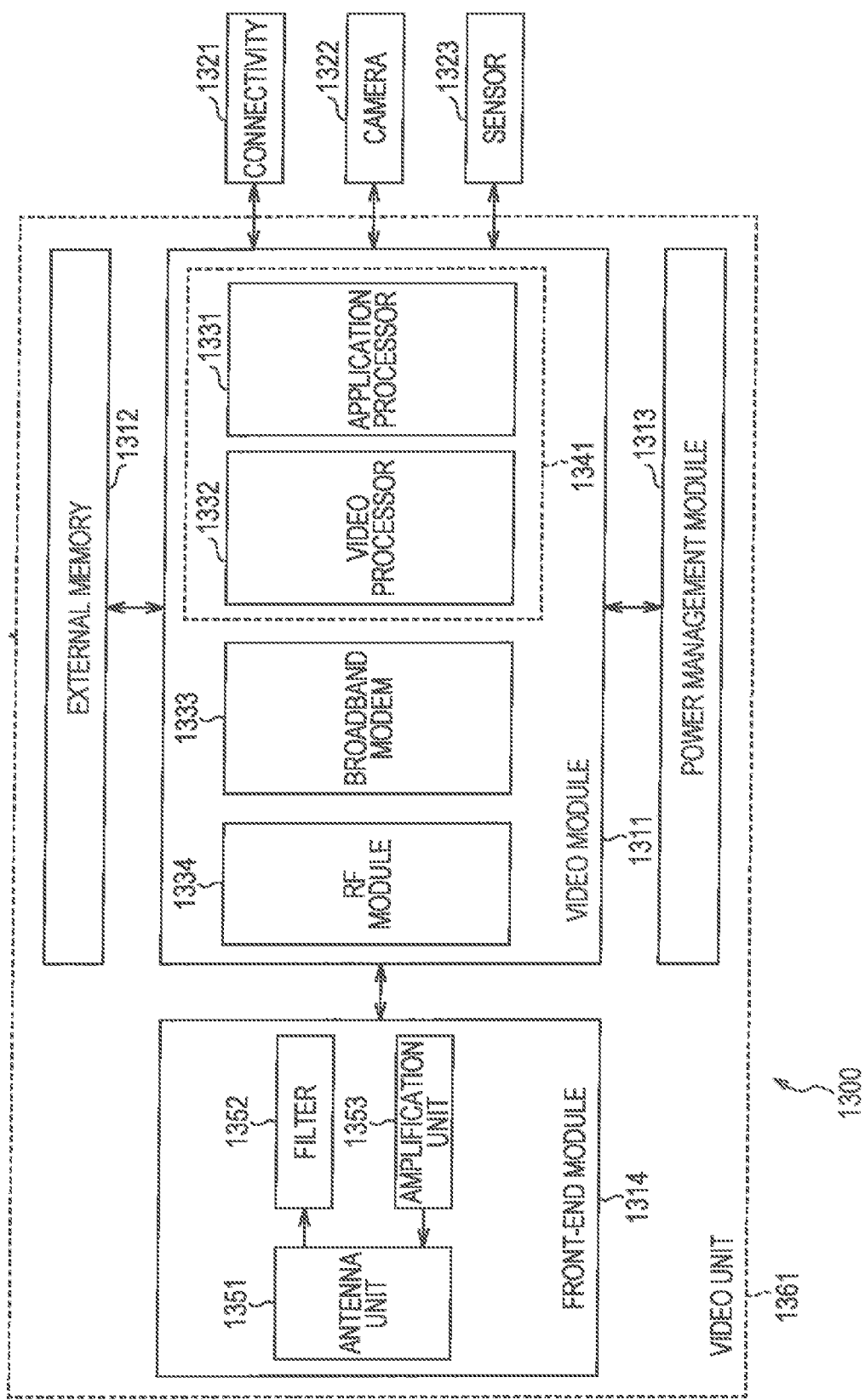
FIG. 31 is a block diagram schematically showing an example structure of a video set.

Referring now to FIG. 31, an example case where the present technology is embodied as a set is described. FIG. 31 schematically shows an example structure of a video set to which the present technology is applied.

In recent years, electronic apparatuses have become multifunctional. In the process of development and manufacture of electronic apparatuses, not only one structure in such electronic apparatuses is to be sold or provided, or a structure having one function is manufactured, but also one set having various functions is manufactured by combining structures having relevant functions in many cases these days.

The video set 1300 shown in FIG. 31 is such a multifunctional structure, and is formed by combining a device having a function related to image encoding and decoding (or encoding or decoding, or both encoding and decoding) with another function related to the function.

As shown in FIG. 31, the video set 1300 includes modules such as a video module 1311, an external memory 1312, a power management module 1313, and a front-end module 1314, and devices having relevant functions, such as connectivity 1321, a camera 1322, and a sensor 1323.

A module is formed by integrating the functions of components related to one another, and serves as a component having the integrated functions. Although its specific physical structure is not limited, a module may be formed by placing electronic circuit elements such as processors, resistors, and capacitors having respective functions on a wiring board or the like, and be integrated thereon. Alternatively, a new module may be formed by combining a module with another module, a processor, or the like.

In the example case shown in FIG. 31, the video module 1311 is formed by combining structures having functions related to image processing, and includes an application processor, a video processor, a broadband modem 1333, and an RF module 1334.

A processor is formed by integrating a structure having predetermined functions into a semiconductor chip by System On a Chip (SoC), and some processors are called system Large Scale Integrations (LSI), for example. The structure having the predetermined functions may be a logic circuit (a hardware structure), may be a structure including a CPU, a ROM, and a RAM, and a program (a software structure) to be executed with these components, or may be a structure formed by combining the two structures. For example, a processor may include a logic circuit, a CPU, a ROM, and a RAM, one of the functions may be realized by the logic circuit (hardware structure), and the other functions may be realized by the program (software structure) executed by the CPU.

The application processor 1331 in FIG. 31 is a processor that executes an application related to image processing. The application to be executed by the application processor 1331 can not only perform an arithmetic process but also control structures inside and outside the video module 1311, such as the video processor 1332, as necessary, to realize predetermined functions.

The video processor 1332 is a processor having functions related to image encoding and decoding (encoding and/or decoding).

The broadband modem 1333 obtains an analog signal by performing digital modulation or the like on data (a digital signal) to be transmitted through wired or wireless (or wired and wireless) broadband communication being conducted via a broadband network such as the Internet or a public telephone network, or converts an analog signal received through the broadband communication into data (a digital signal) by demodulating the analog signal. The broadband modem 1333 processes information, such as image data to be processed by the video processor 1332, a stream generated by encoding image data, an application program, and setting data.

The RF module 1334 is a module that performs frequency conversion, modulation/demodulation, amplification, filtering, or the like on an Radio Frequency (RF) signal to be transmitted or received via an antenna. For example, the RP module 1334 generates an RF signal by performing frequency conversion or the like on a baseband signal generated by the broadband modem 1333. The RF module 1334 also generates a baseband signal by performing frequency conversion or the like on an RF signal received via the front-end module 1314, for example.

As indicated by a dashed line 1341 in FIG. 31, the application processor 1331 and the video processor 1332 may be integrated and formed as one processor.

The external memory 1312 is a module that is provided outside the video module 1311 and has a storage device to be used by the video module 1311. The storage device of the external memory 1312 may be realized by any physical structure. Normally, the storage device is often used for storing large volumes of data such as frame-based image data. Therefore, the storage device is preferably realized by a relatively inexpensive, large-capacity semiconductor memory, such as a Dynamic Random Access Memory (DRAM).

The power management module 1313 manages and controls the power supply to the video module 1311 (the respective structures in the video module 1311).

The front-end module 1314 is a module that provides the RF module 1334 with front-end functions (circuits at the transmission and reception ends of the antenna). As shown in FIG. 31, the front-end module 1314 includes an antenna unit 1351, a filter 1352, and an amplification unit 1353, for example.

The antenna unit 1351 includes an antenna that transmits and receives radio signals, and peripheral structures around the antenna. The antenna unit 1351 transmits a signal supplied from the amplification unit 1353 as a radio signal, and supplies a received radio signal as an electrical signal (RF signal) to the filter 1352. The filter 1352 performs filtering or the like on an RF signal received via the antenna unit 1351, and supplies the processed RF signal to the RP module 1334. The amplification unit 1353 amplifies an RF signal supplied from the RF module 1334, and supplies the amplified RF signal to the antenna unit 1351.

The connectivity 1321 is a module that has a function related to connection to the outside. The connectivity 1321 may have any kind of physical structure. For example, the connectivity 1321 includes a structure that has a communication function compliant with standards other than the communication standards with which the broadband modem 1333 is compliant, and an external input/output terminal or the like.

For example, the connectivity 1321 may include a module having a communication function compliant with wireless communication standards such as Bluetooth (a registered trade name), IEEE 802.11 (such as Wireless Fidelity (Wi-Fi: a registered trade name), Near Field Communication (NFC), or InfraRed Data Association (IrDA), and an antenna or the like that transmits and receives signals compliant with the standards. Alternatively, the connectivity 1321 may include a module having a communication function compliant with cable communication standards such as Universal Serial Bus (USB) or High-Definition Multimedia Interface (a registered trade name) (HDMI), and a terminal compliant with the standards. Further, the connectivity 1321 may have some other data (signal) transmission function or the like, such as an analog input/output terminal.

The connectivity 1321 may include a device that is a data (signal) transmission destination. For example, the connectivity 1321 may include a drive (inclusive of not only a drive for removable media, but also a hard disk, an Solid State Drive (SSD), a Network Attached Storage (NAS), or the like) that performs data reading and writing on a recording medium such as a magnetic disk, an optical disk, a magnetooptical disk, or a semiconductor memory. The connectivity 1321 may also include an image or sound output device (a monitor, a speaker, or the like).

The camera 1322 is a module that has the function to image an object and obtain image data of the object. The image data obtained through the imaging performed by the camera 1322 is supplied to the video processor 1332 and is encoded.

The sensor 1323 is a module having a sensor function, such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. Data detected by the sensor 1323 is supplied to the application processor 1331, and is used by an application, for example.

The structures described as modules above may be embodied as processors, and the structures described as processors above may be embodied as modules.

In the video set 1300 having the above described structure, the present technology can be applied to the video processor 1332 as will be described later. Accordingly, the video set 1300 can be embodied as a set to which the present technology is applied.

<Example Structure of the Video Processor>

Figure 32:
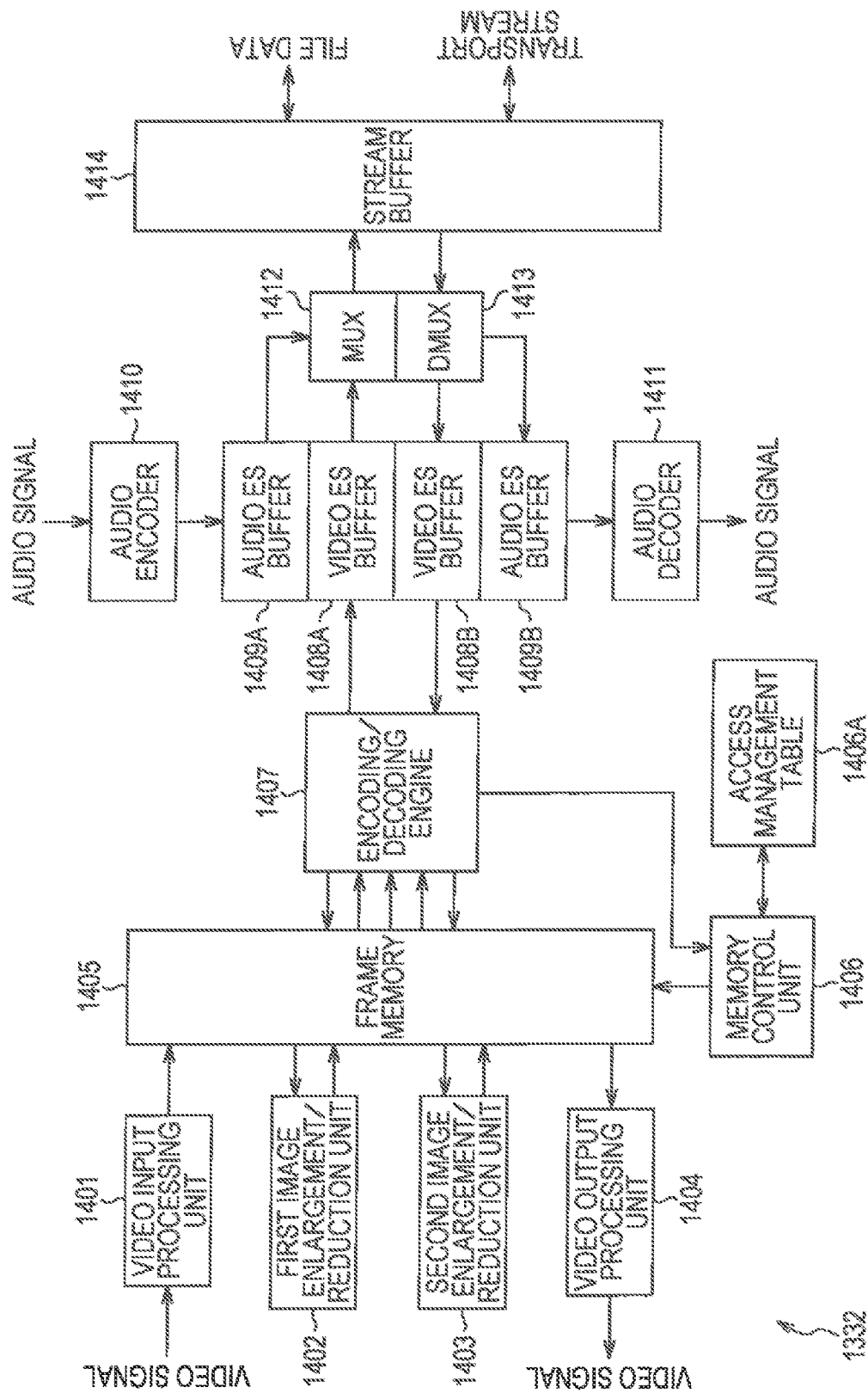
FIG. 32 is a block diagram schematically showing an example structure of a video processor.

FIG. 32 schematically shows an example structure of the video processor 1332 (FIG. 31) to which the present technology is applied.

In the example case shown in FIG. 32, the video processor 1332 has a function to receive inputs of a video signal and an audio signal, and encode these signals by a predetermined method, and a function to decode encoded video data and audio data, and reproduce and output a video signal and an audio signal.

As shown in FIG. 32, the video processor 1332 includes a video input processing unit 1401, a first image enlargement/reduction unit 1402, a second image enlargement/reduction unit 1403, a video output processing unit 1404, a frame memory 1405, and a memory control unit 1406. The video processor 1332 also includes an encoding/decoding engine 1407, video Elementary Stream (ES) buffers 1408A and 1408B, and audio ES buffers 1409A and 1409B. The video processor 1332 further includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 31), for example, and converts the video signal into digital image data. The first image enlargement/reduction unit 1402 performs format conversion, an image enlargement/reduction process, or the like on image data. The second image enlargement/reduction unit 1403 performs an image enlargement/reduction process on image data in accordance with the format at the output destination via the video output processing unit 1404, or, like the first image enlargement/reduction unit 1402, performs format conversion, an image enlargement/reduction process, or the like. The video output processing unit 1404 performs format conversion, conversion to an analog signal, or the like on image data, and outputs the result as a reproduced video signal to the connectivity 1321, for example.

The frame memory 1405 is an image data memory that is shared among the video input processing unit 1401, the first image enlargement/reduction unit 1402, the second image enlargement/reduction unit 1403, the video output processing unit 1404, and the encoding/decoding engine 1407. The frame memory 1405 is embodied as a semiconductor memory such as a DRAM.

The memory control unit 1406 receives a synchronization signal from the encoding/decoding engine 1407, and controls write and read access to the frame memory 1405 in accordance with a schedule of access to the frame memory 1405 written in an access management table 1406A. The access management table 1406A is updated by the memory control unit 1406 in accordance with processes performed by the encoding/decoding engine 1407, the first image enlargement/reduction unit 1402, the second image enlargement/reduction unit 1403, and the like.

The encoding/decoding engine 1407 performs an image data encoding process, and a process of decoding a video stream that is data generated by encoding image data. For example, the encoding/decoding engine 1407 encodes image data read from the frame memory 1405, and sequentially writes the encoded image data as a video stream into the video ES buffer 1408A. Also, the encoding/decoding engine 1407 sequentially reads and decodes a video stream from the video ES buffer 1408B, and sequentially writes the decoded video stream as image data into the frame memory 1405, for example. In the encoding and the decoding, the encoding/decoding engine 1407 uses the frame memory 1405 as a work area. The encoding/decoding engine 1407 also outputs a synchronization signal to the memory control unit 1406 when a process for a macroblock is started, for example.

The video ES buffer 1408A buffers a video stream generated by the encoding/decoding engine 1407, and supplies the video stream to the multiplexer (MUX) 1412. The video ES buffer 1408B buffers a video stream supplied from the demultiplexer (DMUX) 1413, and supplies the video stream to the encoding/decoding engine 1407.

The audio ES buffer 1409A buffers an audio stream generated by the audio encoder 1410, and supplies the audio stream to the multiplexer (MUX) 1412. The audio ES buffer 1409B buffers an audio stream supplied from the demultiplexer (DMUX) 1413, and supplies the audio stream to the audio decoder 1411.

The audio encoder 1410 performs digital conversion, for example, on an audio signal input from the connectivity 1321 or the like, and encodes the audio signal by a predetermined method such as an MPEG audio method or Audio Code number 3 (AC3). The audio encoder 1410 sequentially writes an audio stream that is the data generated by encoding the audio signal, into the audio ES buffer 1409A. The audio decoder 1411 decodes an audio stream supplied from the audio ES buffer 1409B, performs conversion to an analog signal, for example, and supplies the result as a reproduced audio signal to the connectivity 1321 or the like.

The multiplexer (MUX) 1412 multiplexes a video stream and an audio stream. Any method can be used in this multiplexing (or any format can be used for the bit stream to be generated by the multiplexing). In this multiplexing, the multiplexer (MUX) 1412 may also add predetermined header information or the like to the bit stream. That is, the multiplexer (MUX) 1412 can convert a stream format by performing multiplexing. For example, the multiplexer (MUX) 1412 multiplexes a video stream and an audio stream, to convert the format to a transport stream that is a bit stream in a format for transfer. Also, the multiplexer (MUX) 1412 multiplexes a video stream and an audio stream, to convert data to data (file data) in a file format for recording, for example.

The demultiplexer (DMUX) 1413 demultiplexes a bit stream generated by multiplexing a video stream and an audio stream, by a method compatible with the multiplexing performed by the multiplexer (MUX) 1412. Specifically, the demultiplexer (DMUX) 1413 extracts a video stream and an audio stream from a bit stream read from the stream buffer 1414 (or separates a video stream and an audio stream). That is, the demultiplexer (DMUX) 1413 can convert a stream format by performing demultiplexing (the reverse conversion of the conversion performed by the multiplexer (MUX) 1412). For example, the demultiplexer (DMUX) 1413 acquires, via the stream buffer 1414, a transport stream supplied from the connectivity 1321, the broadband modem 1333, or the like, and demultiplexes the transport stream, to convert the transport stream into a video stream and an audio stream. Also, the demultiplexer (DMUX) 1413 acquires, via the stream buffer 1414, file data read from a recording medium of any kind through the connectivity 1321, for example, and demultiplexes the file data, to convert the file data into a video stream and an audio stream.

The stream buffer 1414 buffers a bit stream. For example, the stream buffer 1414 buffers a transport stream supplied from the multiplexer (MUX) 1412, and supplies the transport stream to the connectivity 1321, the broadband modem 1333, or the like at a predetermined time or in response to a request or the like from the outside.

Also, the stream buffer 1414 buffers file data supplied from the multiplexer (MUX) 1412, and supplies the file data to the connectivity 1321 or the like at a predetermined time or in response to a request or the like from the outside, to record the file data into a recording medium of any kind, for example.

Further, the stream buffer 1414 buffers a transport stream obtained via the connectivity 1321, the broadband modem 1333, or the like, and supplies the transport stream to the demultiplexer (DMUX) 1413 at a predetermined time or in response to a request or the like from the outside.

Also, the stream buffer 1414 buffers file data read from a recording medium of any kind in the connectivity 1321 or the like, and supplies the file data to the demultiplexer (DMUX) 1413 at a predetermined time or in response to a request or the like from the outside.

Next, an example operation of the video processor 1332 having the above structure is described. For example, a video signal that is input from the connectivity 1321 or the like to the video processor 1332 is converted into digital image data by a predetermined format such as the 4:2:2 Y/Cb/Cr format in the video input processing unit 1401, and the digital image data is sequentially written into the frame memory 1405. The digital image data is also read into the first image enlargement/reduction unit 1402 or the second image enlargement/reduction unit 1403, is subjected to format conversion to a predetermined format such as the 4:2:0 Y/Cb/Cr format, and an enlargement/reduction process, and is again written into the frame memory 1405. The image data is encoded by the encoding/decoding engine 1407, and is written as a video stream into the video ES buffer 1408A.

Meanwhile, an audio signal that is input from the connectivity 1321 or the like to the video processor 1332 is encoded by the audio encoder 1410, and is written as an audio stream into the audio ES buffer 1409A.

The video stream in the video ES buffer 1408A and the audio stream in the audio ES buffer 1409A are read into the multiplexer (MUX) 1412, are then multiplexed, and are converted into a transport stream or file data. A transport stream generated by the multiplexer (MUX) 1412 is buffered by the stream buffer 1414, and is then output to an external network via the connectivity 1321, the broadband modem 1333, or the like. File data generated by the multiplexer (MUX) 1412 is buffered by the stream buffer 1414, is output to the connectivity 1321 or the like, and is recorded into a recording medium of any kind.

Meanwhile, a transport stream that is input from an external network to the video processor 1332 via the connectivity 1321, the broadband modem 1333, or the like is buffered by the stream buffer 1414, and is then demultiplexed by the demultiplexer (DMUX) 1413. Also, file data that is read from a recording medium of any kind in the connectivity 1321 or the like and is input to the video processor 1332 is buffered by the stream buffer 1414, and is then demultiplexed by the demultiplexer (DMUX) 1413. That is, a transport stream or file data that is input to the video processor 1332 is divided into a video stream and an audio stream by the demultiplexer (DMUX) 1413.

An audio stream is supplied to the audio decoder 1411 via the audio ES buffer 1409B, and is then decoded, to reproduce an audio signal. Meanwhile, a video stream is written into the video ES buffer 1408B, is then sequentially read and decoded by the encoding/decoding engine 1407, and is written into the frame memory 1405. The decoded image data is subjected to an enlargement/reduction process by the second image enlargement/reduction unit 1403, and is written into the frame memory 1405. The decoded image data is then read into the video output processing unit 1404, is subjected to format conversion to a predetermined format such as the 4:2:2 Y/Cb/Cr format, is further converted into an analog signal, so that a video signal is reproduced and output.

In a case where the present technology is applied to the video processor 1332 having the above structure, the present technology according to the respective embodiments described above is applied to the encoding/decoding engine 1407. That is, the encoding/decoding engine 1407 should have the functions of the encoding device 10 and the decoding device 110 according to the above described embodiments, for example. With this, the video processor 1332 can achieve the same effects as the effects described above with reference to FIGS. 1 through 25.

In the encoding/decoding engine 1407, the present technology (or the functions of the encoding device and the decoding device according to the respective embodiments described above) may be embodied by hardware such as a logic circuit, may be embodied by software such as an embedded program, or may be embodied by both hardware and software.

<Another Example Structure of the Video Processor>

Figure 33:
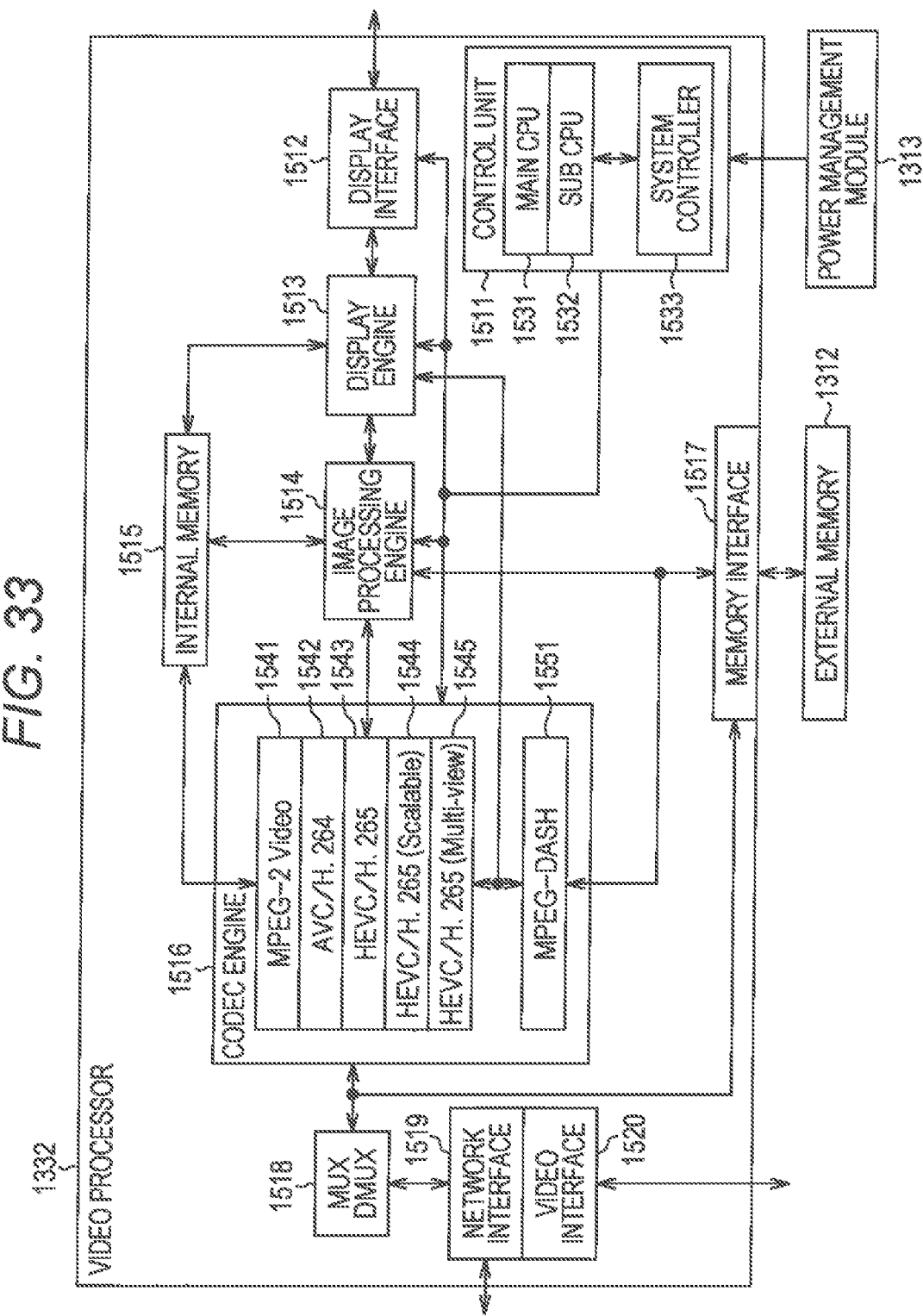
FIG. 33 is a block diagram schematically showing another example structure of a video processor.

FIG. 33 schematically shows another example structure of the video processor 1332 to which the present technology is applied. In the example case shown in FIG. 33, the video processor 1332 has a function to encode and decode video data by a predetermined method.

More specifically, as shown in FIG. 33, the video processor 1332 includes a control unit 1511, a display interface 1512, a display engine 1513, an image processing engine 1514, and an internal memory 1515. The video processor 1332 also includes a codec engine 1516, a memory interface 1517, a multiplexer/demultiplexer (MUX DMUX) 1518, a network interface 1519, and a video interface 1520.

The control unit 1511 controls operations of the respective processing units in the video processor 1332, such as the display interface 1512, the display engine 1513, the image processing engine 1514, and the codec engine 1516.

As shown in FIG. 33, the control unit 1511 includes a main CPU 1531, a sub CPU 1532, and a system controller 1533, for example. The main CPU 1531 executes a program or the like for controlling operations of the respective processing units in the video processor 1332. The main CPU 1531 generates a control signal in accordance with the program or the like, and supplies the control signal to the respective processing units (or controls operations of the respective processing units). The sub CPU 1532 plays an auxiliary role for the main CPU 1531. For example, the sub CPU 1532 executes a child process, a subroutine, or the like of the program or the like to be executed by the main CPU 1531. The system controller 1533 controls operations of the main CPU 1531 and the sub CPU 1532, such as designating programs to be executed by the main CPU 1531 and the sub CPU 1532.

Under the control of the control unit 1511, the display interface 1512 outputs image data to the connectivity 1321, for example. The display interface 1512 converts digital image data into an analog signal, and outputs the image data as a reproduced video signal or the digital image data as it is to a monitor device or the like of the connectivity 1321, for example.

Under the control of the control unit 1511, the display engine 1513 performs various conversion processes such as format conversion, size conversion, and color gamut conversion on image data, so as to conform to the hardware specifications of the monitor device or the like that will display the image.

Under the control of the control unit 1511, the image processing engine 1514 performs predetermined image processing, such as filtering for improving image quality, on image data.

The internal memory 1515 is a memory that is shared among the display engine 1513, the image processing engine 1514, and the codec engine 1516, and is provided in the video processor 1332. The internal memory 1515 is used in data exchange among the display engine 1513, the image processing engine 1514, and the codec engine 1516, for example. The internal memory 1515 stores data supplied from the display engine 1513, the image processing engine 1514, or the codec engine 1516, and supplies the data to the display engine 1513, the image processing engine 1514, or the codec engine 1516 as necessary (in response to a request, for example). The internal memory 1515 may be realized by any storage device. Normally, the internal memory 1515 is often used for storing small volumes of data such as block-based image data and parameters. Therefore, the internal memory 1515 is preferably realized by a semiconductor memory that has a relatively small capacity (compared with the external memory 1312) but has a high response speed, such as an Static Random Access Memory (SRAM).

The codec engine 1516 performs processing related to encoding and decoding of image data. The codec engine 1516 is compatible with any encoding/decoding method, and the number of compatible methods may be one, or may be two or greater. For example, the codec engine 1516 has a codec functions compatible with encoding/decoding methods, and may encode image data or decode encoded data by a method selected from among those methods.

In the example shown in FIG. 33, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551, as functional blocks for processing related to codec.

The MPEG-2 Video 1541 is a functional block that encodes or decodes image data by MPEG-2. The AVC/H.264 1542 is a functional block that encodes or decodes image data by AVC. The HEVC/H.265 1543 is a functional block that encodes or decodes image data by HEVC. The HEVC/H.265 (Scalable) 1544 is a functional block that performs scalable encoding or scalable decoding on image data by HEVC. The HEVC/H.265 (Multi-view) 1545 is a functional block that performs multi-view encoding or multi-view decoding on image data by HEVC.

The MPEG-DASH 1551 is a functional block that transmits and receives image data by MPEG-Dynamic Adaptive Streaming over HTTP (MPEG-DASH). MPEG-DASH is a technology for conducting video stream using HyperText Transfer Protocol (HTTP), and one of the features thereof lies in selecting and transmitting, on a segment basis, an appropriate piece of encoded data from among predetermined pieces of encoded data having different resolutions from one another. The MPEG-DASH 1551 generates a stream compliant with the standards and performs control or the like on transmission of the stream. As for encoding/decoding image data, the MPEG-DASH 1551 uses the MPEG-2 Video 1541 through the HEVC/H.265 (Multi-view) 1545 described above.

The memory interface 1517 is an interface for the external memory 1312. Data supplied from the image processing engine 1514 and the codec engine 1516 is supplied to the external memory 1312 via the memory interface 1517. Meanwhile, data read from the external memory 1312 is supplied to the video processor 1332 (the image processing engine 1514 or the codec engine 1516) via the memory interface 1517.

The multiplexer/demultiplexer (MUX DMUX) 1518 multiplexes or demultiplexes various kinds of data related to images, such as a bit stream of encoded data, image data, and a video signal. Any method may be used in this multiplexing/demultiplexing. For example, at a time of multiplexing, the multiplexer/demultiplexer (MUX DMUX) 1518 may not only integrate pieces of data into one, but also add predetermined header information or the like to the data. At a time of demultiplexing, the multiplexer/demultiplexer (MUX DMUX) 1518 may not only divide one set of data into pieces, but also add predetermined header information or the like to each piece of the divided data. That is, the multiplexer/demultiplexer (MUX DMUX) 1518 can convert a data format by performing multiplexing/demultiplexing. For example, the multiplexer/demultiplexer (MUX DMUX) 1518 can convert a bit stream into a transport stream that is a bit stream in a format for transfer, or into data (file data) in a file format for recording, by multiplexing the bit stream. The reverse conversion is of course also possible through demultiplexing.

The network interface 1519 is an interface for the broadband modem 1333, the connectivity 1321, and the like. The video interface 1520 is an interface for the connectivity 1321, the camera 1322, and the like.

Next, an example operation of this video processor 1332 is described. When a transport stream is received from an external network via the connectivity 1321, the broadband modem 1333, or the like, the transport stream is supplied to the multiplexer/demultiplexer (MUX DMUX) 1518 via the network interface 1519, is demultiplexed, and is decoded by the codec engine 1516. The image data obtained through the decoding performed by the codec engine 1516 is subjected to predetermined image processing by the image processing engine 1514, for example, is subjected to predetermined conversion by the display engine 1513, and is supplied to the connectivity 1321 or the like via the display interface 1512, so that the image is displayed on a monitor. Also, the image data obtained through the decoding performed by the codec engine 1516 is again encoded by the codec engine 1516, is multiplexed and converted into file data by the multiplexer/demultiplexer (MUX DMUX) 1518, is output to the connectivity 1321 or the like via the video interface 1520, and is recorded into a recording medium of any kind.

Further, file data of encoded data that is generated by encoding image data and is read from a recording medium (not shown) by the connectivity 1321 or the like is supplied to the multiplexer/demultiplexer (MUX DMUX) 1518 via the video interface 1520, is demultiplexed, and is decoded by the codec engine 1516. The image data obtained through the decoding performed by the codec engine 1516 is subjected to predetermined image processing by the image processing engine 1514, is subjected to predetermined conversion by the display engine 1513, and is supplied to the connectivity 1321 or the like via the display interface 1512, so that the image is displayed on a monitor. Also, the image data obtained through the decoding performed by the codec engine 1516 is again encoded by the codec engine 1516, is multiplexed and converted into a transport stream by the multiplexer/demultiplexer (MUX DMUX) 1518, is supplied to the connectivity 1321, the broadband modem 1333, or the like via the network interface 1519, and is transmitted to another apparatus (not shown).

Exchange of image data and other data among the respective processing units in the video processor 1332 is conducted with the use of the internal memory 1515 or the external memory 1312, for example. The power management module 1313 controls the power supply to the control unit 1511, for example.

In a case where the present technology is applied to the video processor 1332 having the above structure, the present technology according to the respective embodiments described above is applied to the codec engine 1516. That is, the codec engine 1516 should have the functional blocks that realize the encoding device 10 and the decoding device 110 according to the above described embodiments, for example. With this, the video processor 1332 can achieve the same effects as the effects described above with reference to FIGS. 1 through 25.

In the codec engine 1516, the present technology (or the functions of the encoding device and the decoding device according to the respective embodiments described above) may be embodied by hardware such as a logic circuit, may be embodied by software such as an embedded program, or may be embodied by both hardware and software.

Although two example structures for the video processor 1332 have been described above, the video processor 1332 may have any appropriate structure other than the two example structures described above. The video processor 1332 may be formed as a single semiconductor chip, or may be formed as semiconductor chips. For example, the video processor 1332 may be formed as a three-dimensional stacked LSI in which semiconductors are stacked. Alternatively, the video processor 1332 may be realized by LSIs.

Example Applications to Apparatuses

The video set 1300 can be incorporated into various apparatuses that process image data. For example, the video set 1300 can be incorporated into the television apparatus 900 (FIG. 27), the portable telephone apparatus 920 (FIG. 28), the recording/reproducing apparatus 940 (FIG. 29), the imaging apparatus 960 (FIG. 30), and the like. As the video set 1300 is incorporated into an apparatus, the apparatus can achieve the same effects as the effects described above with reference to FIGS. 1 through 25.

A portion of a structure in the above described video set 1300 can be embodied as a structure to which the present technology is applied, as long as the portion includes the video processor 1332. For example, the video processor 1332 can be embodied as a video processor to which the present technology is applied. Also, the processors indicated by the dashed line 1341, the video module 1311, and the like can be embodied as a processor, a module, and the like to which the present technology is applied. Further, the video module 1311, the external memory 1312, the power management module 1313, and the front-end module 1314 may be combined into a video unit 1361 to which the present technology is applied. With any of the above structures, the same effects as the effects described above with reference to FIGS. 1 through 25 can be achieved.

That is, like the video set 1300, any structure including the video processor 1332 can be incorporated into various kinds of apparatuses that process image data. For example, the video processor 1332, the processors indicated by the dashed line 1341, the video module 1311, or the video unit 1361 can be incorporated into the television apparatus 900 (FIG. 27), the portable telephone apparatus 920 (FIG. 28), the recording/reproducing apparatus 940 (FIG. 29), the imaging apparatus 960 (FIG. 30), and the like. As any of the structures to which the present technology is applied is incorporated into an apparatus, the apparatus can achieve the same effects as the effects described above with reference to FIGS. 1 through 25, as in the case of the video set 1300.

In this specification, examples in which various information pieces are multiplexed with an encoded stream and are transmitted from the encoding side to the decoding side have been described. However, the method of transmitting the information is not limited to the above examples. For example, the information pieces may be transmitted or recorded as separate data associated with an encoded bit stream, without being multiplexed with the encoded bit stream. Note that the term "associate" means to allow images (which may be part of images such as slices or blocks) contained in a bit stream to be linked to the information corresponding to the images at the time of decoding. That is, the information may be transmitted via a transmission path different from that for the images (or the bit stream). Alternatively, the information may be recorded in a recording medium (or in a different area in the same recording medium) other than the recording medium for the images (or the bit stream). Furthermore, the information and the images (or the bit stream) may be associated with each other in any units such as in units of some frames, one frame, or part of a frame.

The present technology can also be in the following forms.

(1)

An image processing device including;

an encoding unit that generates an encoded stream by encoding an image in compliance with a coding standard for performing encoding on each unit having a recursive hierarchical structure; and a setting unit that sets identification data as syntax of the encoded stream, the identification data identifying an extended profile that is an extension of a profile specified in the coding standard.

(2)

The image processing device of any one of (1) and (3) through (7), wherein the setting unit sets a parameter as syntax of the encoded stream, the parameter indicating a setting state of a coding tool required in specifying the extended profile.

(3)

The image processing device of any one of (1), (2), and (4) through (7), wherein the coding tool includes at least one of intra coding, existence/nonexistence of Reorder, a bit rate, and a minimum encoded bit.

(4)

The image processing device of any one of (1) through (3), and (5) through (7), wherein the parameter includes at least one of general_intra_constraint_flag,
general_max_10bit_constraint_flag,
general_max_12 bit_constraint_flag,
general_max_16bit_constraint_flag,
general_reserved_zero_2bits,
general_max_400chroma_constraint_flag,
general_max_420chroma_constraint_flag,
general_max_422chroma_constraint_flag, and
general_reserved_zero_35bits.

(5)

The image processing device of any one of (1) through (4), (6), and (7), wherein the parameter includes at least one of sub_layer_intra_constraint_flag,
sub_layer_max_10bit_constraint_flag,
sub_layer_max_12bit_constraint_flag,
sub_layer_max_16bit_constraint_flag,
sub_layer_reserved_zero_2bits,
sub_layer_max_400chroma_constraint_flag,
sub_layer_max_420chroma_constraint_flag,
sub_layer_max_422chroma_constraint_flag, and
sub_layer_reserved_zero_35bits[i].

(6)

The image processing device of any one of (1) through (5), and (7), wherein the setting unit sets the identification data as syntax represented by profile_tier_level( ).

(7)

The image processing device of any one of (1) through (6), wherein the coding standard is HEVC (High Efficiency Video Coding)/H.265, and an additional profile to be newly added to the extended profile includes at least one of High 4:0:0 16 Profile,
High 4:4:4 16 Profile,
Main 12 Intra Profile,
Main 4:2:2 12 Intra Profile,
Main 4:4:4 12 Intra Profile,
High 4:0:0 16 Intra Profile, and
High 4:4:4 16 Intra Profile.

(8)
An image processing method including:
setting identification data as syntax of an encoded stream generated by encoding an image in compliance with a coding standard for performing encoding on each unit having a recursive hierarchical structure, the identification data identifying an extended profile that is an extension of a profile specified in the coding standard; and
generating the encoded stream by encoding the image in compliance with the coding standard.

(9)
An image processing device including:
a parsing unit that parses identification data from an encoded stream encoded in compliance with a coding standard for encoding an image for each unit having a recursive hierarchical structure, the identification data identifying an extended profile that is an extension of a profile specified in the coding standard; and
a decoding unit that decodes the encoded stream by referring to the identification data parsed by the parsing unit.

(10)
The image processing device of any one of (9) and (11) through (15), wherein the parsing unit parses a parameter from the encoded stream, the parameter indicating a setting state of a coding tool required in specifying the extended profile.

(11)
The image processing device of any one of (9), (10), and (12) through (15), wherein the coding tool includes at least one of intra coding, existence/nonexistence of Reorder, a bit rate, and a minimum encoded bit.

(12)
The image processing device of any one of (9) through (11), and (13) through (15), wherein the parameter includes at least one of
general_intra_constraint_flag,
general_max_10bit_constraint_flag,
general_max_12bit_constraint_flag,
general_max_16bit_constraint_flag,
general_reserved_zero_2bits,
general_max_400chroma_constraint_flag,
general_max_420chroma_constraint_flag,
general_max_422chroma_constraint_flag, and
general_reserved_zero_35bits.

(13)
The image processing device of any one of (9) through (12), (14), and (15), wherein the parameter includes at least one of
sub_layer_intra_constraint_flag,
sub_layer_max_10bit_constraint_flag,
sub_layer_max_12bit_constraint_flag,
sub_layer_max_16bit_constraint_flag,
sub_layer_reserved_zero_2bits,
sub_layer_max_400chroma_constraint_flag,
sub_layer_max_420chroma_constraint_flag,
sub_layer_max_422chroma_constraint_flag, and
sub_layer_reserved_zero_35bits[i].

(14)
The image processing device of any one of (9) through (13), and (15), wherein the setting unit sets the identification data as syntax represented by profile_tier_level( ).

(15)
The image processing device of any one of (9) through (14), wherein
the coding standard is High Efficiency Video Coding (HEVC)/H.265, and an additional profile to be newly added to the extended profile includes at least one of
High 4:0:0 16 Profile,
High 4:4:4 16 Profile,
Main 12 Intra Profile,
Main 4:2:2 12 Intra Profile,
Main 4:4:4 12 Intra Profile,
High 4:0:0 16 Intra Profile, and
High 4:4:4 16 Intra Profile.

(16)
An image processing method including:
parsing identification data from an encoded stream encoded in compliance with a coding standard for encoding an image for each unit having a recursive hierarchical structure, the identification data identifying an extended profile that is an extension of a profile specified in the coding standard; and
decoding the encoded stream by referring to the parsed identification data.

(21)
An image processing device including:
a setting unit that sets a parameter indicating a setting state of a coding tool required in specifying an extended profile that is an extension of a profile specified in a coding standard for performing encoding on each unit having a recursive hierarchical structure; and
an encoding unit that generates an encoded stream by encoding an image in accordance with the parameter set by the setting unit.

(22)
The image processing device of (21), wherein the setting unit sets the parameter as syntax of the encoded stream to be generated by the encoding unit.

(23)
The image processing device of (22), wherein the coding tool includes at least one of intra coding, existence/nonexistence of Reorder, a bit rate, and a minimum encoded bit.

(24)
The image processing device of (23), wherein the parameter includes general_intra_constraint_flag.

(25)
The image processing device of (24), wherein the parameter further includes sub_layer_intra_constraint_flag.

(26)
The image processing device of any one of (23) through (25), wherein the parameter includes
general_max_10bit_constraint_flag and
general_max_12bit_constraint_flag.

(27)
The image processing device of (26), wherein the parameter further includes
sub_layer_max_10bit_constraint_flag and
sub_layer_max_12bit_constraint_flag.

(28)
The image processing device of any one of (23) through (27), wherein the parameter includes
general_max_400chroma_constraint_flag,
general_max_420chroma_constraint_flag, and
general_max_422chroma_constraint_flag.

(29)
The image processing device of (28), wherein the parameter further includes
sub_layer_max_400chroma_constraint_flag,
sub_layer_max_420chroma_constraint_flag, and
sub_layer_max_422chroma_constraint_flag.

(30)

The image processing device of any one of (23) through (29), wherein the parameter includes general_reserved_zero_35bits.

(31)

The image processing device of (30), wherein the parameter further includes sub_layer_reserved_zero_35bits[i].

(32)

The image processing device of any one of (21) through (31), wherein the coding standard is HEVC Range Extension, which is an extended standard of High Efficiency Video Coding (HEVC)/H.265.

(33)

The image processing device of (32), wherein an additional profile to be newly added to the extended profile includes at least one of
Main 12 Intra Profile,
Main 4:2:2 12 Intra Profile, and
Main 4:4:4 12 Intra Profile.

(34)

An image processing method including:
setting a parameter indicating a setting state of a coding tool required in specifying an extended profile that is an extension of a profile specified in a coding standard for performing encoding on each unit having a recursive hierarchical structure; and
generating an encoded stream by encoding an image in accordance with the parameter set by the setting unit.

(35)

An image processing device including:
a parsing unit that parses a parameter from an encoded stream encoded in compliance with a coding standard for encoding an image for each unit having a recursive hierarchical structure, the parameter indicating a setting state of a coding tool required in specifying an extended profile that is an extension of a profile specified in the coding standard; and
a decoding unit that decodes the encoded stream by referring to the parameter parsed by the parsing unit.

(36)

The image processing device of (35), wherein the parsing unit parses the parameter as syntax of the encoded stream.

(37)

The image processing device of (35) or (36), wherein the coding tool includes at least one of intra coding, existence/nonexistence of Reorder, a bit rate, and a minimum encoded bit.

(38)

The image processing device of any one of (35) through (37), wherein the coding standard is HEVC Range Extension, which is an extended standard of High Efficiency video Coding (HEVC)/H.265.

(39)

An image processing method including:
parsing a parameter from an encoded stream encoded in compliance with a coding standard for encoding an image for each unit having a recursive hierarchical structure, the parameter indicating a setting state of a coding tool required in specifying an extended profile that is an extension of a profile specified in the coding standard; and
decoding the encoded stream by referring to the parsed parameter.

REFERENCE SIGNS LIST

10 Encoding device
11 Setting unit
12 Encoding unit
13 Transmission unit
30 Control unit
110 Decoding device
111 Reception unit
112 Parsing unit
113 Decoding unit
146 Control unit

The invention claimed is:

1. An image processing device, comprising:
circuitry configured to:
determine an extended profile based on at least one of general_max_10bit_constraint_flag or general_max_12bit_constraint_flag, wherein
the extended profile is an extension of a profile that is specified in a coding standard, and
the extended profile supports a bit depth of up to 16 bits as opposed to the coding standard;
calculate a cost function value for each of a plurality of prediction modes based on the extended profile;
determine an optimum prediction mode of the plurality of prediction modes based on the cost function value for each of the plurality of prediction modes; and
encode an image, based on the optimum prediction mode, to generate an encoded stream, wherein the image is encoded according to a recursive hierarchical structure of each coding block of a plurality of coding blocks.

2. The image processing device according to claim 1, wherein the circuitry is further configured to:
determine the extended profile based on an intra-coding coding tool.

3. The image processing device according to claim 1, wherein the circuitry is further configured to determine the extended profile based on a syntax that supports at least one of a 4:2:0 chrominance format, a 4:2:2 chrominance format, or a 4:4:4 chrominance format.

4. The image processing device according to claim 2, wherein the circuitry is further configured to determine the extended profile based on general_intra_constraint_flag.

5. The image processing device according to claim 1, wherein the circuitry is further configured to determine the extended profile based on general_max_8bit_constraint_flag.

6. The image processing device according to claim 3, wherein the circuitry is further configured to determine the extended profile based on at least one of general_max_monochrome_constraint_flag, general_max_420chroma_constraint_flag, or general_max_422chroma_constraint_flag.

7. The image processing device according to claim 1, wherein the coding standard is HEVC Range Extension that is an extended standard of High Efficiency Video Coding (HEVC)/H.265.

8. An image processing method, comprising:
determining an extended profile based on at least one of general_max_10bit_constraint_flag or general_max_12bit_constraint_flag, wherein
the extended profile is an extension of a profile that is specified in a coding standard, and
the extended profile supports a bit depth of up to 16 bits as opposed to the coding standard;
calculating a cost function value for each of a plurality of prediction modes based on the extended profile;
determining an optimum prediction mode of the plurality of prediction modes based on the cost function value; and encoding an image, based on the optimum prediction mode, to generate an encoded stream, wherein the image is encoded according to a recursive hierarchical structure of each coding block of a plurality of coding blocks.

9. An image processing device, comprising:
circuitry configured to:
  determine an extended profile based on at least one of general_max_10bit_constraint_flag or general_max_12bit_constraint_flag, wherein
    the extended profile is an extension of a profile that is specified in a coding standard, and
    the extended profile supports a bit depth of up to 16 bits as opposed to the coding standard;
  calculate a cost function value for each of a plurality of prediction modes based on the extended profile;
  determine an optimum prediction mode of the plurality of prediction modes based on the cost function value; and
  decode an encoded stream based on the extended profile, wherein
    the encoded stream is encoded based on a recursive hierarchical structure of each coding block of a plurality of coding blocks, and
    the encoded stream is encoded based on the optimum prediction mode.

10. The image processing device according to claim 9, wherein the circuitry is further configured to determine the extended profile based on an intra-coding coding tool.

11. The image processing device according to claim 9, wherein the circuitry is further configured to determine the extended profile based on a syntax that supports at least one of a 4:2:0 chrominance format, a 4:2:2 chrominance format, or a 4:4:4 chrominance format.

12. The image processing device according to claim 10, wherein the circuitry is further configured to determine the extended profile based on general_intra_constraint_flag.

13. The image processing device according to claim 9, wherein the circuitry is further configured to determine the extended profile based on general_max_8bit_constraint_flag.

14. The image processing device according to claim 11, wherein the circuitry is further configured to determine the extended profile based on at least one of general_max_monochrome_constraint_flag, general_max_420chroma_constraint_flag, or general_max_422chroma_constraint_flag.

15. The image processing device according to claim 9, wherein the coding standard is HEVC Range Extension that is an extended standard of High Efficiency Video Coding (HEVC)/H.265.

16. An image processing method, comprising:
determining an extended profile based on at least one of general_max_10bit_constraint_flag or general_max_12bit_constraint_flag, wherein
  the extended profile is an extension of a profile that is specified in a coding standard, and
  the extended profile supports a bit depth of up to 16 bits as opposed to the coding standard;
calculating a cost function value for each of a plurality of prediction modes based on the extended profile;
determining an optimum prediction mode of the plurality of prediction modes based on the cost function value; and
decoding an encoded stream based on the extended profile, wherein
  the encoded stream is encoded based on a recursive hierarchical structure of each coding block of a plurality of coding blocks, and
  the encoded stream is encoded based on the optimum prediction mode.

* * * * *